United States Patent [19]
Al-Chalabi

[11] Patent Number: 5,754,493
[45] Date of Patent: May 19, 1998

[54] ANALYSIS OF VELOCITY DATA

[76] Inventor: Mahboub Al-Chalabi, 25 Prince Consort Drive, Ascot Berks SL5 8AW, United Kingdom

[21] Appl. No.: 557,015

[22] PCT Filed: Jun. 6, 1994

[86] PCT No.: PCT/GB94/01228

§ 371 Date: Dec. 5, 1995

§ 102(e) Date: Dec. 5, 1995

[87] PCT Pub. No.: WO94/29751

PCT Pub. Date: Dec. 22, 1994

[30] Foreign Application Priority Data

Jun. 7, 1993 [GB] United Kingdom ............... 93 11750

[51] Int. Cl.$^6$ ........................................... G01V 1/30
[52] U.S. Cl. ............................................. 367/38
[58] Field of Search .............................. 367/38, 59, 63, 367/73, 74

[56] References Cited

U.S. PATENT DOCUMENTS

| | | | |
|---|---|---|---|
| 3,864,667 | 2/1975 | Bahjat | 367/48 |
| 3,898,610 | 8/1975 | Pennebaker, Jr. | 367/38 |
| 5,008,861 | 4/1991 | Gallagher | 367/59 |
| 5,058,079 | 10/1991 | Wright et al. | 367/59 |

FOREIGN PATENT DOCUMENTS

| | | |
|---|---|---|
| 0 397 313 A2 | 11/1990 | European Pat. Off. |
| 1 317 765 | 5/1973 | United Kingdom |

OTHER PUBLICATIONS

Acheson, "Time–depth and velocity–depth relations in sedimentary basins—A study based on current investigation in the Arctic Islands and an interpretation of experience elsewhere," *Geophysics*, vol. 46, No. 5 (May 1981), pp. 707–716.

Carter, "Depth conversion using normalized interval velocities," *Geophysics*, Jan. 1989, pp. 15–16.

Faust, "Seismic Velocity as a Function of Depth and Geologic Time," *Geophysics*, vol. 16, 1951, pp. 192–206.

Gardner et al., "Formation Velocity and Density—the Diagnostic Basis for Stratigraphic Traps," *Geophysics*, vol. 39, 1974, pp. 770–780.

Gibson et al., "Non–linear Least–squares Inversion of Traveltime Data for a Linear Velocity–depth Relationship," *Geophysics*, Feb. 1979, pp. 185–194.

Kaufman, "Velocity Functions in Seismic Prospecting," *Geophysics*, vol. 10, 1953, pp. 180–196.

Legge et al., "Least Squares Determination of the Velocity Function $V = V_0 + kz$ for any set of Time Depth Data," *Geophysics*, vol. 8, 1943, pp. 356–361.

MacDonald et al., "Inversion of Reflection Traveltimes and Amplitudes," *Geophysics*, May 1987, pp. 606–617.

Marshall, "Parameter Optimization of Velocity Depth Functions of Given Form by use of Root–mean–square Velocities," *Geophysical Prospecting*, vol. 20, 1972, pp. 700–711.

Marsden, "$V_0$–K method of depth conversion," *Geophysics*, Aug. 1992, pp. 53–54.

Schultz, "A Method for Direct Estimation of Interval Velocities," *Geophysics*, Dec. 1982, pp. 1657–1671.

*Primary Examiner*—Jan J. Lobo
*Attorney, Agent, or Firm*—Lowe, Price, LeBlanc & Becker

[57] ABSTRACT

The invention is concerned with the analysis of velocity data such as sonic data obtained from wells. The invention includes analyzing time versus depth data and generating velocity versus depth data and generating velocity versus depth function. A significant feature is the recognition that translating the observed time versus depth data along the time axis in time-depth domain can be used to obtain a match with a time versus depth curve corresponding a velocity versus depth function. The invention also makes use of visual displays which show degree-of-fit data in parameter spaces. These displays represent an important means for generating velocity versus depth functions.

30 Claims, 16 Drawing Sheets

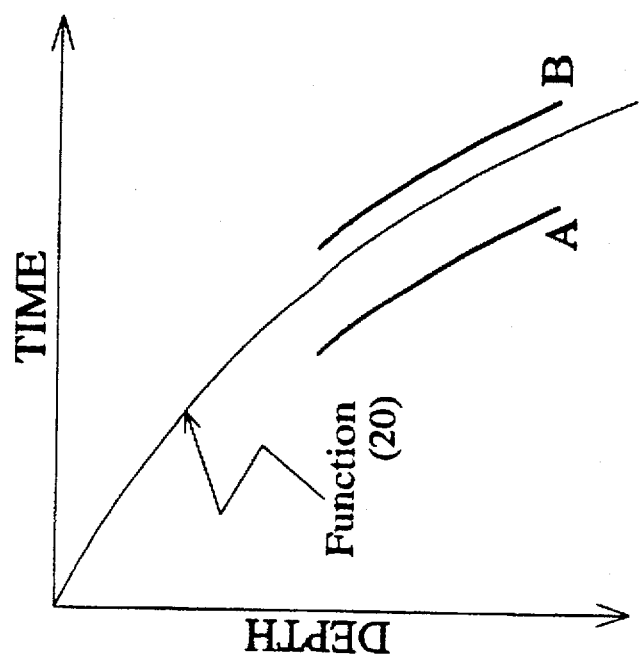
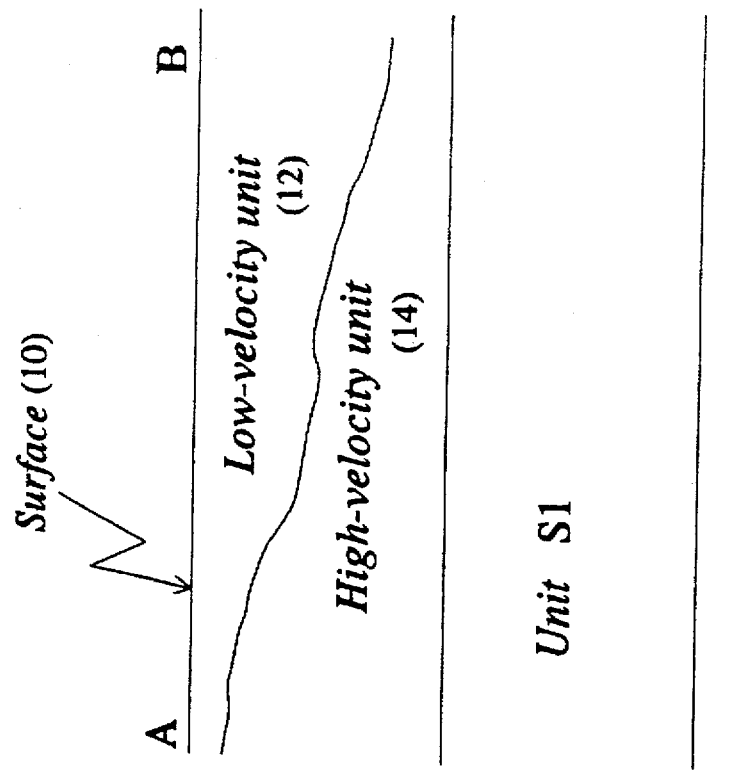
Figure 2a

Figure 7    Curve 1

Figure 8    Curve 2

Figure 9  Curve 3

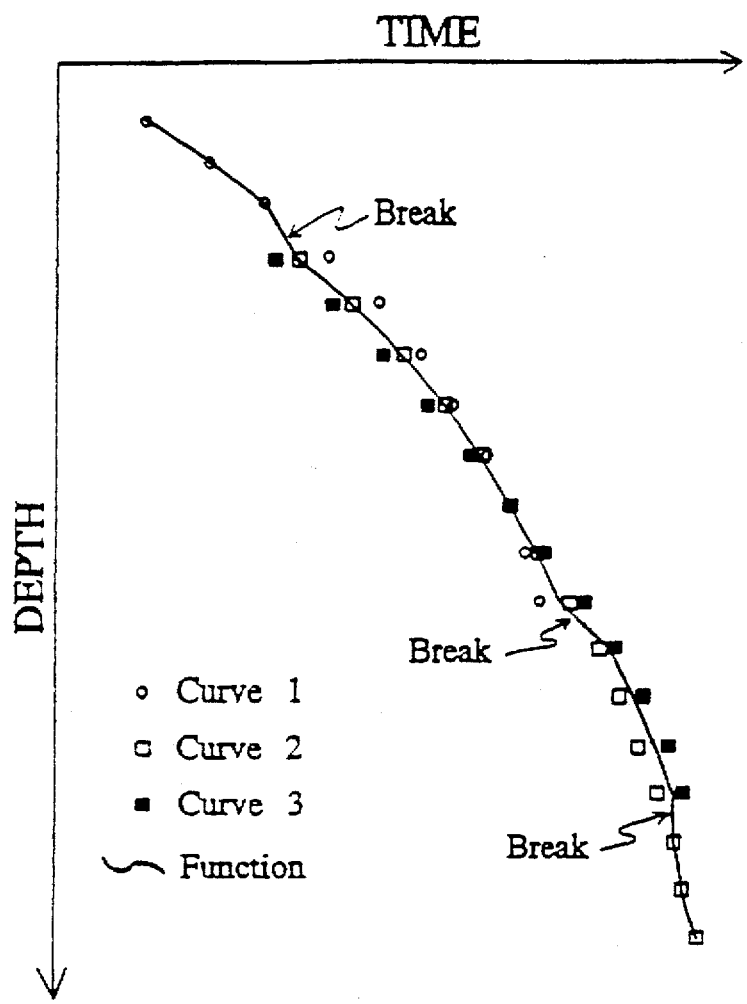
Figure 15. Schematic diagram showing breaks in the generated time versus depth numerical function at curve extremities 5,754,493

ANALYSIS OF VELOCITY DATA

FIELD OF INVENTION

This invention relates to the analysis of velocity data such as sonic log data obtained from wells. Inter alia, the invention deals with the generation of functions that provide a representation of the variation of seismic velocity in the ground with depth.

BACKGROUND ART

Sonic data are a predominant form of velocity data used in the generation of velocity versus depth functions.

Sonic data are acquired from wells which have been bored in the ground by measuring the travel time of sonic signals along segments of the borehole over ranges that usually cover most of its length. Other types of velocity data may be obtained from an analysis of reflection travel times. These reflections arise when the seismic waves from an acoustic source, such as an explosion, i.e. seismic pulse travel through the ground and are reflected back to the surface (land or water) where they are recorded and subsequently processed. Yet other types of velocity data might be obtained from travel time data of seismic waves emitted by acoustic sources in the surface and picked up by receivers in a borehole or vice versa. In other cases, the sources may be placed in one borehole and the receivers in another borehole.

The data, whether from a borehole or surface measurements or from a combination of the two types, are then analyzed and calibrated as necessary. Such data essentially constitute the observed velocity data. The data are then used to obtain for example a representation of the variation of velocity with depth in the area to which the data pertain or refer. This representation can be expressed in the form of a mathematical function—the velocity versus depth function, for example.

On the basis of the velocity function, it is possible to derive certain estimates relating for example to the depths of various layers in that area. These depths are then used to construct a structural model of relevant horizons in the subsurface which is then used in determining for example the likelihood of the presence of hydrocarbon accumulations in the ground and the potential volume of such accumulations. The depth estimates also provide a basis for drilling locations and programmes. The velocity representation also provides information on the rock properties which in turn provide geological information that is relevant to exploring for hydrocarbons.

The variation of velocity in the ground may be represented mathematically by a velocity versus depth or velocity versus time function. The mathematical representation gives a smooth description of the true variations that tend to be rapidly variable, as will be explained below. In the present invention, an additional representation is given in the form of a numerical function described in Appendix 1. (In the present text, reference to functions will imply a mathematical and not a numerical function, unless stated otherwise.)

The instantaneous velocity is a basic quantity in the present invention. The instantaneous velocity at a given depth refers to the speed of the seismic wavefront at that particular depth in the direction of propagation or the velocity in an infinitesimally small thickness of the rock at that depth which, in mathematical notation, may be represented by $$V_{ins}=dZ/dT$$

where Z represents depth and T represents time. It may also be taken as the velocity value which is measured by the sonic device at that depth. Strictly speaking, the measured velocity in this case represents the velocity across a finite thickness of rock which is spanned by the measurement device. However, reference to this velocity as instantaneous velocity is adequate for most practical purposes and for the purpose of the present invention. Sometimes, the term instantaneous velocity is used to refer to the velocity across a smaller or a larger interval than that measured by the sonic log device. The present invention includes these cases regardless of the actual nomenclature used. In particular, it includes cases where interval velocities such as might be obtained from seismic reflection surveys are used as data in the function generation process. These velocities refer to much coarser intervals than those measured by the sonic device. The generation of velocity functions from interval velocity data and from other data spanning coarse intervals is given in Appendix 2.

Typically, the value of the instantaneous velocity changes in a rapid fluttered manner down the borehole as illustrated schematically in FIG. 1. In fact, the velocity versus depth function, which is a mathematical representation of the variation of the instantaneous velocity with depth, generally gives a smooth representation that describes the variation in a gross general way as illustrated schematically by the smooth curve in FIG. 1. Hence, reference to the variation of the instantaneous velocity with depth in terms of the velocity function would normally imply this smooth variation. An exception to this smooth variation is the numerical function described in Appendix 1.

The variation of velocity in the ground may also be represented in terms of instantaneous velocity as a function of time, the time being generally the total travel time of the seismic wave from the surface or from some other reference level to the point to which the instantaneous velocity corresponds. The variation of the instantaneous velocity as a function of total travel time (not depth) is not readily supportable on geological grounds. The use of this kind of function stems largely from the mathematical convenience of its formulation. The present invention mainly presents velocity as a function of depth. The generation of velocity versus time functions is presented in Appendix 3.

The variation of velocity in the ground may also be represented in terms of slowness functions such as the instantaneous slowness versus depth function. Slowness is the reciprocal of velocity and instantaneous slowness is the reciprocal of instantaneous velocity. In mathematical notation, it may be represented by $S_{ins}=dT/dZ$. As in the case of instantaneous velocity, the term instantaneous slowness will be used in the present invention to include situations where the slowness refers to an interval that might be smaller than, equal to or larger than the interval measured by the sonic device.

The generation of slowness functions such as the instantaneous slowness versus depth function is one of the totally novel concepts introduced by the present invention. It is implied throughout the present text that all the aspects relating to the velocity function are also applicable to the slowness function. Further details of the slowness function are given in Appendix 4.

The variation of the instantaneous velocity with depth differs widely from one geological unit to another. A geological unit (or what in the text is simply referred to as unit) is defined here as a rock formation or layer or the like in which the behavior of the instantaneous velocity as represented by the velocity versus depth function (or any other function describing the variation of instantaneous velocity in the ground) is substantially the same throughout its lateral extent. At any one location, several units will usually be present down to the deepest level of interest. In certain situations, the behavior of the instantaneous velocity within a given unit might vary laterally in a gradual manner. Strictly speaking, when the variation is such that the function parameters applicable to one location can no longer be considered as providing adequate description of the variation of instantaneous velocity with depth at another location, the unit should be treated as being a different unit. However, in such cases, it is often simpler for practical purposes to obtain function parameter estimates at specific locations and then to use these estimates to produce contour maps of parameter values over the area in question.

Currently, the velocity versus depth function (in the sense of the mathematical representation of the instantaneous velocity variation with depth as described above) is the most commonly used form to represent the velocity variations in the ground. For this reason, the various features of the present invention will be described using this function as the main example. However, many other types of function can be employed to represent the velocity variation in the ground. For example, the variation may be represented by a time versus depth function, an interval velocity versus depth function, an average velocity (where the average is measured from the top of the unit or from some other level and where the averaging may be simple, root mean square (rms) or another form) versus depth, slowness (instantaneous, interval or average slowness) versus depth, among others. These representations are all equivalent to the velocity versus depth function representation. For example, the time versus depth function frequently can be derived directly from the velocity versus depth function; the interval velocity function is obtained from the velocity over an interval that is considered too coarse to give the instantaneous velocity; the average velocity function is obtainable from an integration of the instantaneous velocity; the slowness function is the reciprocal of the velocity function and so on. Likewise, the velocity versus time function representation has equivalent representations in the form of a time versus depth function, an interval velocity versus time function, an average velocity versus time function, a slowness versus time function, among others. The present invention includes all of the above functions.

The velocity versus depth function can be expressed in a variety of forms. Each form is characterized by a set of parameters. For example, the function pertaining to a given unit might be expressed in the linear form $$V_z = V_0 + kZ$$

where $V_z$ is the value of the instantaneous velocity at depth Z. $V_0$ and k are the parameters whose specific values provide a description of the variation of the instantaneous velocity with depth in that unit (see for example J. A. Legge and J. J. Rupnik, 1943, Least squares determination of the velocity function $V_z = V_0 + k\ Z$, Geophysics, vol. 8, p. 356).

Examples of other forms are the Faust relationship $$V_z = A\ Z^{1/n}$$

whose parameters are A and n (L. Y. Faust, 1951, Seismic velocity as a function of depth and geologic time, Geophysics, vol. 16, p. 192).

In the form $$V_z = V_0(1 + a\ Z)^{1/n}$$

the function has three parameters, $V_0$, a and n.

The generation of the velocity function in a given form is essentially a process of determining the relevant parameter values. In view of the non-uniqueness aspect which is discussed later the function generation process in the present invention will be considered in the sense of estimating the parameter value rather than a determination in the sense of obtaining an absolutely accurate or unique value.

A given velocity versus depth function may be transformed into a time versus depth function or relationship. For example, from the linear form shown above the travel time T corresponding to depth Z can be expressed in the following manner:

$$T = \{\log_e[(V_0 + kZ)/V_0]\}/k$$

Reference to velocity versus depth functions in the present text also implies the corresponding time versus depth functions or relationships. Further discussion of function transformation is presented below in conjunction with function generation domains.

More than one function form may provide an adequate representation of the variation of instantaneous velocity with depth in a given unit. In normal application, however, one form is used per unit which may or may not be similar to the form used in another unit.

The domain in which the function generation is carried out can, for example, be time-depth, velocity-depth, velocity-time, slowness-time. The choice of the most suitable function generation domain depends on the details of the function being generated and on the available data. For example, if sonic data are available for generating a velocity versus depth function then the time-depth domain is the most appropriate domain. If only interval velocity data from a seismic reflection survey are available then the velocity-depth domain would often be the most suitable domain for generating this function.

Clearly, the data used for the function generation (the observed data) need to be the same as the function generation domain. Likewise, the curve corresponding to the function being generated (the calculated curve) must also be transformed to the form required for that domain— Obviously no transformation is required if the function is already in that form. For example, for generating the linear velocity versus depth function $$V_z = V_0 + kZ$$

(i.e. for determining $V_0$ and k) in the velocity-depth domain use the above form directly and in the time-depth domain use $$T = \{\log_e[(V_o + kZ)/V_o]\}/k$$

These are all equivalent forms of the same function. However, not all functions can be readily transformed explicitly to the form required in a particular domain, thus limiting the possibility of generating the function in that domain. For example, the function $$V_z = V_0 + kZ^{1/n}$$

cannot be transformed to a time-depth form in a readily usable manner.

In the present invention, function generation is presented mainly in the time-depth domain but also in the velocity-depth and velocity-time domains. In the last two domains, the term velocity is used in the sense of instantaneous velocity including the case where the instantaneous velocity is approximated by interval velocity. However, it is implied throughout the present text that all the aspects relating to the velocity-depth and velocity-time domains are also applicable to the slowness-depth and slowness-time domains as well as average velocity-depth and average velocity-time domains.

In the present text, function derivation in the time-depth domain will be described in detail; derivation in the velocity-depth and velocity-time domains will be given afterwards. The term time versus depth curve will be used here to denote a curve in the conventional sense or a set of discrete time-depth data points with or without a curve joining them.

Function generation techniques known to date have been quite problematic. Derivation in the velocity-depth (and velocity-time) domain is usually subject to the scatter of sonic velocities as mentioned above. A general method for derivation in the time-depth domain had not existed prior to the present invention. In the derivations that had been attempted, the time versus depth data had remained fixed in the time-depth space. This is a fundamental error. Generally, therefore, a match between a given observed time versus depth curve and a time versus depth curve corresponding to a velocity versus depth function could not be effected correctly. For the same reason, time versus depth curves pertaining to the same unit but originating from different wells could not be fitted to the same function in a simple way. As explained below, the time versus depth data can generally remain fixed only in the top-most unit, that is the unit immediately below the surface or, equivalently, under the assumption that the geological section from the surface to the level of interest consists of one and the same unit.

SUMMARY OF THE INVENTION

The present invention is concerned primarily with a method of analyzing time versus depth data and generating velocity versus depth functions. The present invention eliminates the aforesaid problems in function generation by demonstrating that translating the observed time versus depth data along the time axis in the time-depth domain is valid and by using this translation in order to obtain a match with a time versus depth curve corresponding to a velocity versus depth function. The translation consists essentially of subtracting or adding an appropriate constant time value to all the points defining the time versus depth curve.

The present invention is also concerned with analyzing time versus depth data, velocity versus depth data, velocity versus time data, slowness versus depth data and slowness versus time data and generating velocity versus time functions, slowness versus depth functions and slowness versus time functions.

A main feature of the present invention is the construction of visual displays in the parameter space, preferably in the form of contours. These displays can refer to any set of values particularly values describing the degree-of-fit between two sets of data such as values of a discrepancy function or measure or an objective function. The contours or alternative visual displays delimit regions of parameter values in which the value of discrepancy or another degree-of-fit measure is limited by the specific value of each contour. This feature allows a powerful means for generating the velocity versus depth function (and other functions) and for controlling the quality of the parameter estimation process as well as a number of other geological applications. In one aspect of the present invention, this feature is claimed as a fundamental part of the invention. It includes the following aspects in particular singly or in combination:

(a) Any goodness-of-fit criterion (such as a discrepancy function or measure) in any appropriate form that expresses the degree of fit between the curves being compared or fitted. For example, the discrepancy in the time-depth domain may be given by a weighted normalized sum of squares of residuals along the time or the depth axis between the observed and the calculated function curve.

(b) Space defined by any number of parameters. Although the feature is best suited for a two-parameter space (i.e. two-dimensional displays) it is also applicable to spaces of higher dimensions.

(c) All pertinent procedures regardless of whether the data analysis, data fitting, discrepancy calculations or the like are carried out in the time-depth domain, the velocity-depth domain, the velocity-time domain the slowness-depth domain or the slowness-time domain. The preferred domain is the time-depth domain.

(d) All procedures where the parameter estimation process uses the principles of these displays implicitly without a visual output.

(e) Output of the value of the discrepancy measure or the goodness-of-fit criterion or the like in any visual form such as when this value is shown in accordance with colour variations, colour intensity, shading, contours, grid values and the like. The preferred form is colour-coded contours.

(f) Output in any form particularly on a monitor screen, screen of any kind, and hard copy of any kind.

In the description of the present invention, only grid/contour displays in a two-parameter space is presented for the sake of simplicity but the above inclusions are implied throughout the description as appropriate.

The present invention also includes procedures for generating numerical functions, detailed in Appendix 1.

The invention will be described now by way of example only with particular reference to the accompanying drawings. Function derivation in the time-depth domain will be given as the main example.

BRIEF DESCRIPTION OF THE DRAWING

FIGS. 2a and 2b are schematic diagrams helpful in describing the illustrating general principles of the present invention

FIG. 15 is a time versus depth curve for numerical function generation.

DESCRIPTION OF THE PREFERRED EMBODIMENT

(A) FUNCTION DERIVATION IN THE TIME-DEPTH DOMAIN

Referring to FIG. 2a there is shown schematically a section through the ground beneath the surface (10). Two wells (A) and (B) are formed vertically in the ground at the position indicated. As can be seen the ground has a substructure comprising a low velocity unit (12) and a high velocity unit (14). Below that there is a unit identified as unit (S1).

The graph in FIG. 2a shows time versus depth data obtained in the two wells (A) and (B) for the unit (S1). The curve (A) represents the sonic data obtained from well (A), that is, at each depth point, the curve gives the total traveltime from some reference level (such as the ground surface) to that point. Curve (B) represents similar sonic data obtained from well (B). As can be seen both curves are for the same unit (S1). The instantaneous velocity in unit (S1) is assumed to vary as a function of depth in that unit. Hence at each depth point the slope of the tangents to both curves will be equal, that is to say the two curves are in essence parallel. The shift along the time axis between the two curves (A) and (B) arises from the differences in travel time in the layer or layers above the unit (S1). That is to say the shift arises from effects not associated with the unit (S1). If one of the curves were to be shifted laterally, that is, translated along the time axis relative to the other until they coincide, the function describing the variation of instantaneous velocity with depth would not be affected.

The value of the instantaneous velocity at each point along either curve would not change.

It is the translation of the time versus depth curves along the time axis which is a principal foundation of the present invention and provides the basis for fitting and combining time versus depth curves from a number of wells and from other sources of velocity data. In the present invention curves that cover different depth ranges are translated so as to fit over their overlapping portions along the depth axis in accordance with an appropriate goodness-of-fit criterion. This may for example be a least squares fit. In particular, the translation process provides the basis for fitting observed time versus depth curves to time versus depth functions (and implicitly their corresponding velocity versus depth functions). This involves translating a curve representing the observed data along the time axis to produce a fit with a time versus depth curve corresponding to an appropriate velocity versus depth function. In FIG. 2a either or both of the curves can be translated along the time axis to fit the time versus depth curve corresponding to a given velocity versus depth function which is shown by the curved line (20). If the fit is satisfactory then this function can be assumed to provide a description of the variation of instantaneous velocity with depth in unit (S1).

Figure 2B:
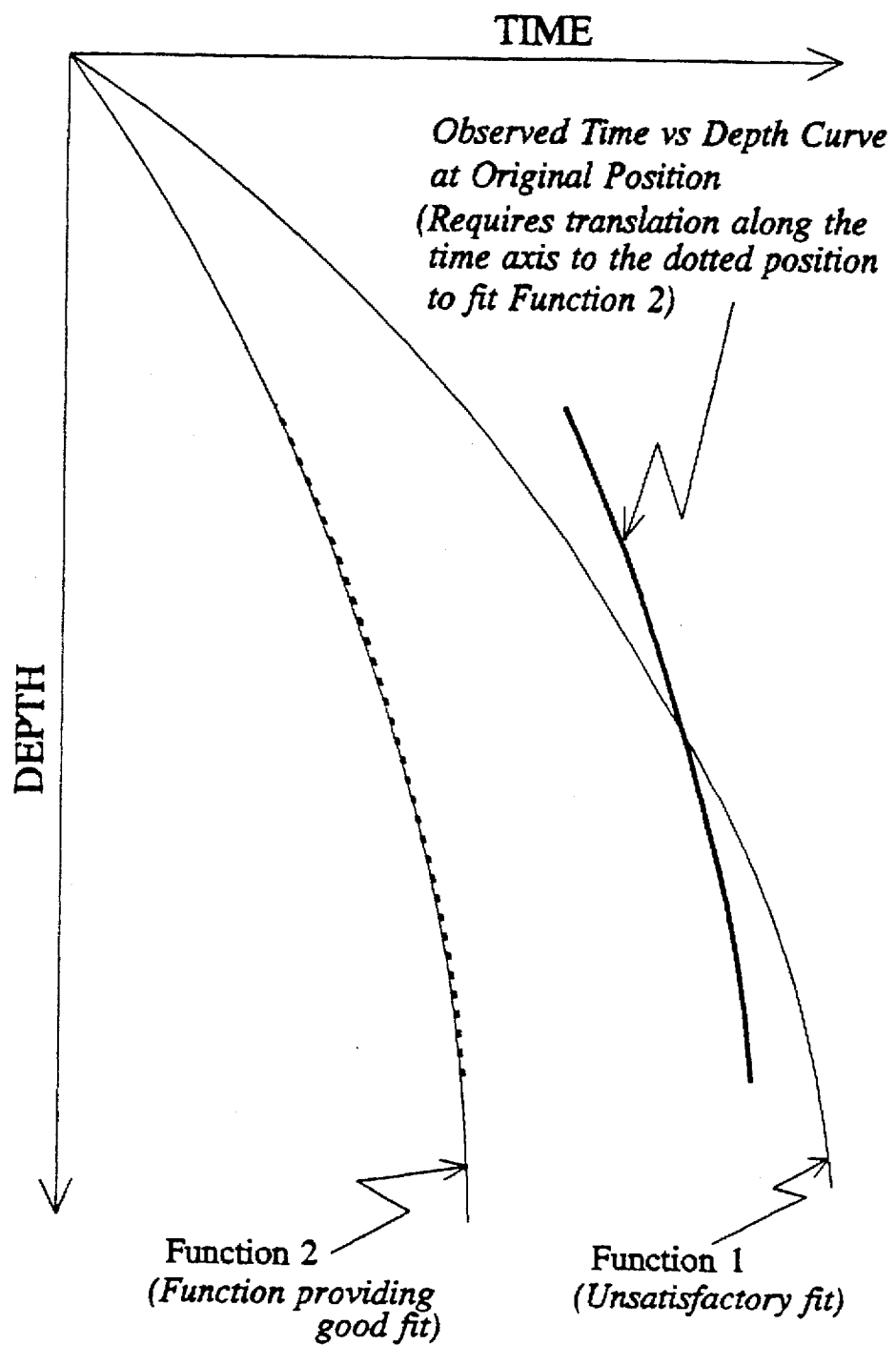

FIG. 2b shows a schematic example where a time versus depth observed curve cannot be satisfactorily fitted to a function curve (Function 1 for example) in its original stationary position. It requires translating along the time axis. to the dotted position in order to produce a satisfactory fit with a function curve (Function 2 for example). Function 2 can then be assumed to provide a description of the variation of instantaneous velocity with depth in the unit to which the curve pertains.

It should be noted that the translation technique is not required in the top-most unit shown for example in FIG. 2a. Time shifts between the curves for that unit cannot be attributed to differences in travel times above that unit. Therefore, strictly speaking, time versus depth curves from different wells and other sources should be substantially coincident in the top-most unit.

There will now be given an illustration of the concepts behind the various aspects of the present invention, including the visual displays of discrepancy, using a number of examples.

It will be assumed throughout the text below that reference to observed time versus depth curves, velocity versus depth curves or velocity versus time curves implies curves pertaining to one given unit unless stated otherwise.

Consider the case of a unit in which the instantaneous velocity varies exactly in accordance with a specific velocity versus depth function and the parameters of this function are unique. That is to say no other set of parameters defining the same function type would produce a function that would exactly fit the time versus depth data corresponding to that unit.

Figure 3:
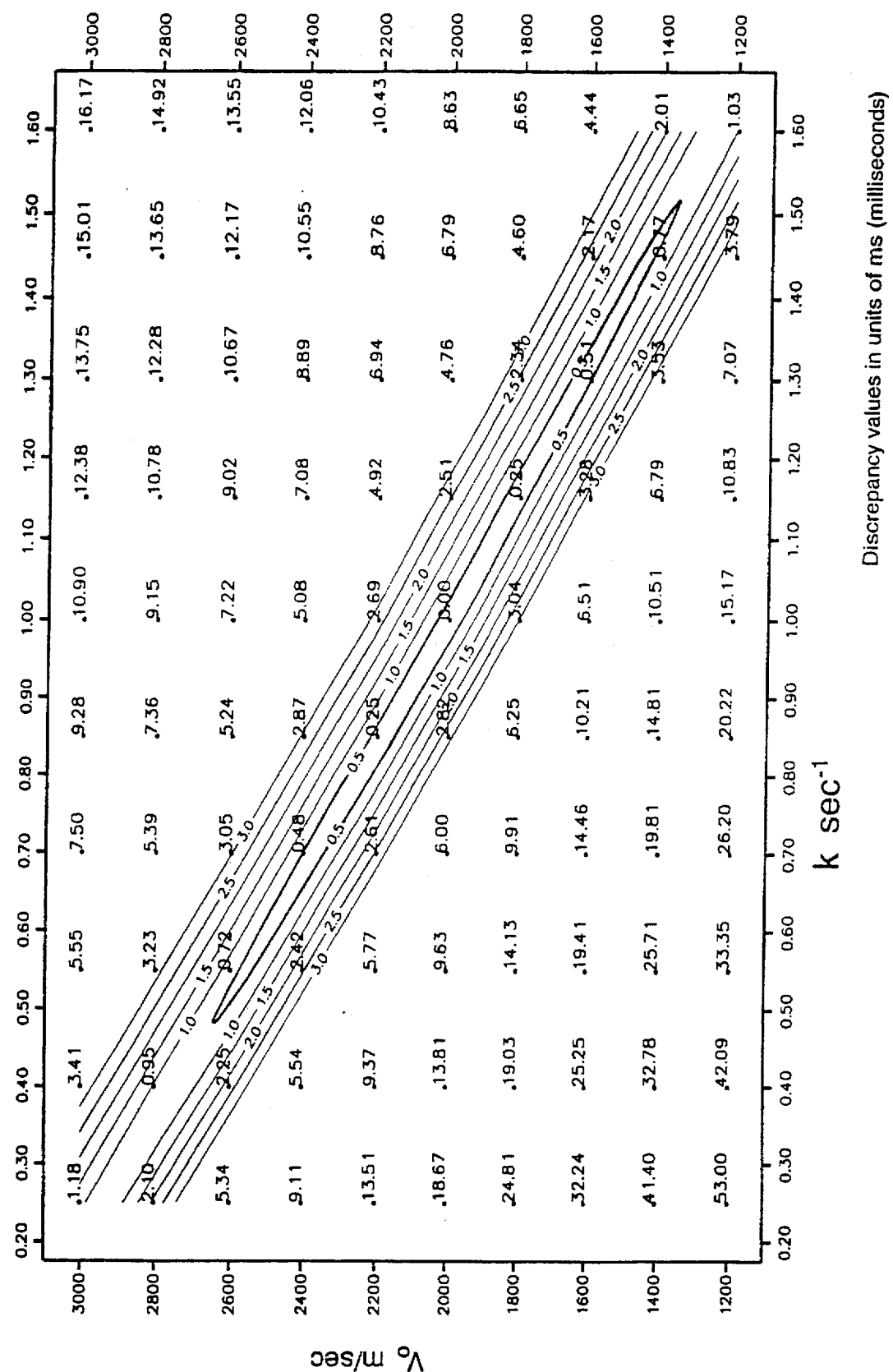
FIGS. 3 to 9 and FIGS. 12 to 14 are plots of velocity vs. the reciprocal of time for some illustrative examples of the present invention.

As a specific example consider a unit such as S1 in FIG. 2a in which the instantaneous velocity varies exactly linearly with depth and has parameter values of $V_0$=2000 m/sec and k=1.0 $sec^{-1}$. This unit is assumed to be 500 meters thick with its top at 1000 meters below the surface. The observed time versus depth curve is assumed to be created from measurements made at depth intervals of 20 meters. The observed curve is fitted to a whole series of time versus depth curves calculated from respective linear velocity versus depth functions, each of these functions corresponding to a given combination of $V_0$ and k values. For each such combination, translation along the time axis is carried out as necessary, that is to say the observed curve is translated so as to produce an optimum fit with the function curve it is being compared with. A quantity $F(V_0, k)$ gives a measure of the discrepancy between the observed curve and each of the functions to which it is fitted. This quantity F is represented by the following equation:

$$F(V_0, k) = \left[ \sum_{i=1}^{m} (T_i - C_i)^2/m \right]^{1/2}$$

where $T_i$ is the observed time at the ith depth point after translation and $C_i$ is the function time at the ith depth point, m being the number of the digitised points on the observed curve. This equation gives a discrepancy function, $F(V_0, k)$, representing what we shall refer to here simply as the average discrepancy of the fit. Using this discrepancy representation it is possible to produce an array of values of F for a range of $V_0$ and k values. These values are shown in FIG. 3 as a grid/contour display. The contours shown in FIG. 3 are overlaid on the grid values. It can be seen that the only combination of $V_0$ and k values that produce an exact fit with the observed time versus depth curve are those corresponding to the true values of 2000 m/sec and 1.0 $sec^{-1}$. However, it can be seen that the contour of value 0.5 ms (milliseconds) extends over a range of $V_0$ values between approximately 1400 and 2600 m/sec and k values of between 0.5 and 1.5 $sec^{-1}$. Any point (i.e. any combination of $V_0$ and k) inside this contour will produce a fit with the observed curve to better than 0.5 ms average discrepancy.

Another observable feature on FIG. 3 is the degree of parallelism between the contours. This feature arises as a consequence of the particular formulation of the function being used (linear variation of velocity with depth in the present case).

The average discrepancy values shown in FIG. 3 are based on ideal conditions which virtually never arise in practice. The contours show the possible parameter combination that would produce a fit within a given margin of uncertainty. They illustrate how, even under these ideal conditions, substantial non-uniqueness in the solution for the function parameters can develop within a small margin of uncertainty. In practice, many factors contribute to this non-uniqueness, e.g. observational errors, length of the observed curve and sampling interval, depth of the unit, difference in the gross behavior of the instantaneous velocity with depth from that represented by the function, etc.

Figure 4:
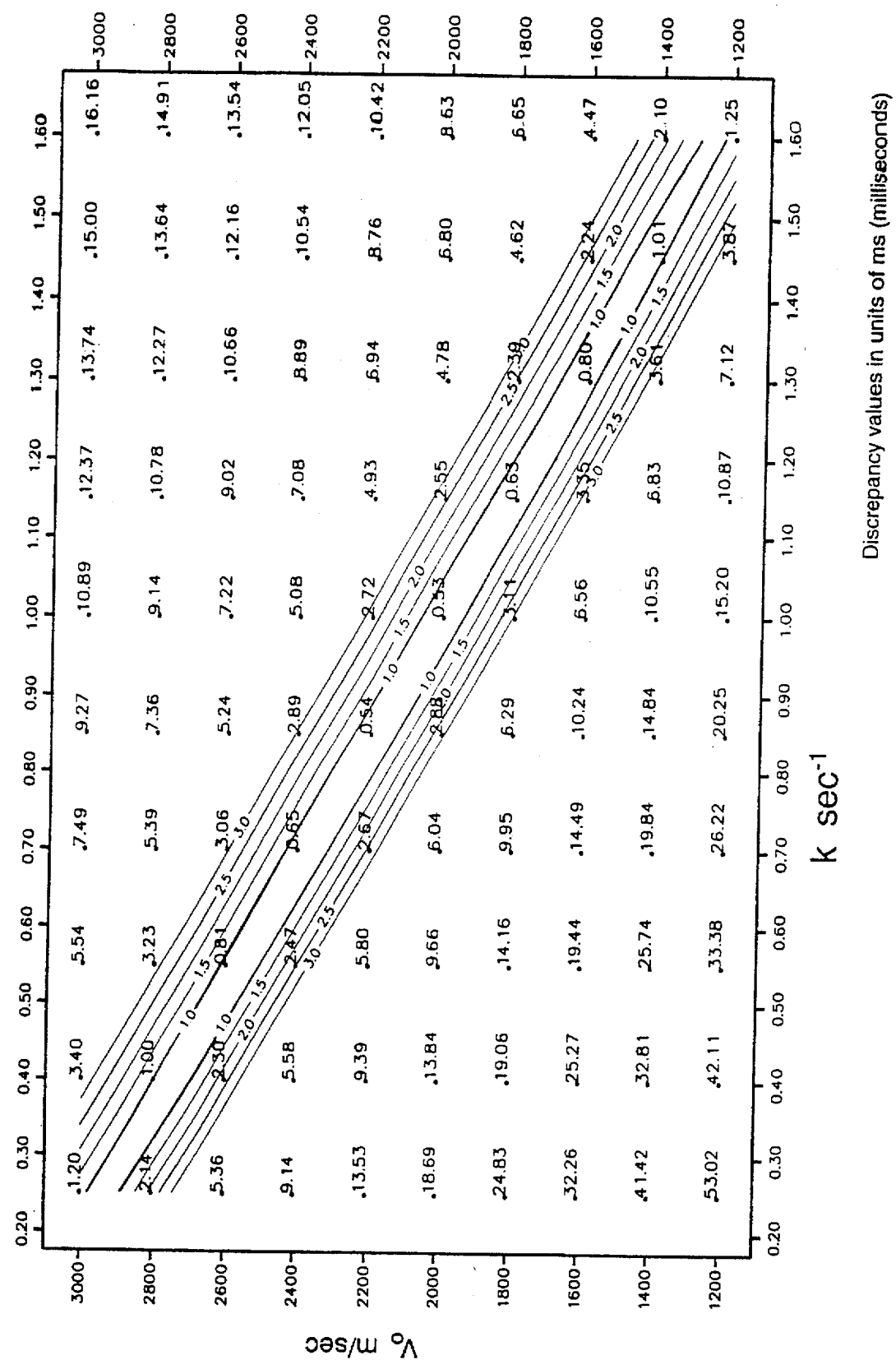

FIG. 4 is used as an illustration. The kind of general error encountered in practice was simulated by a series of random errors of maximum amplitude of ±1.0 ms superimposed on the theoretical time versus depth curve used in FIG. 3. FIG.

4 shows the resulting contours of the discrepancy function, $F(V_0, k)$, over a similar range of $V_0$ and k values as in FIG. 3. As expected, the random errors produce a general increase in the value of discrepancy along the main solution trough, i.e. a general increase in the non-uniqueness of the solution.

Figure 5:
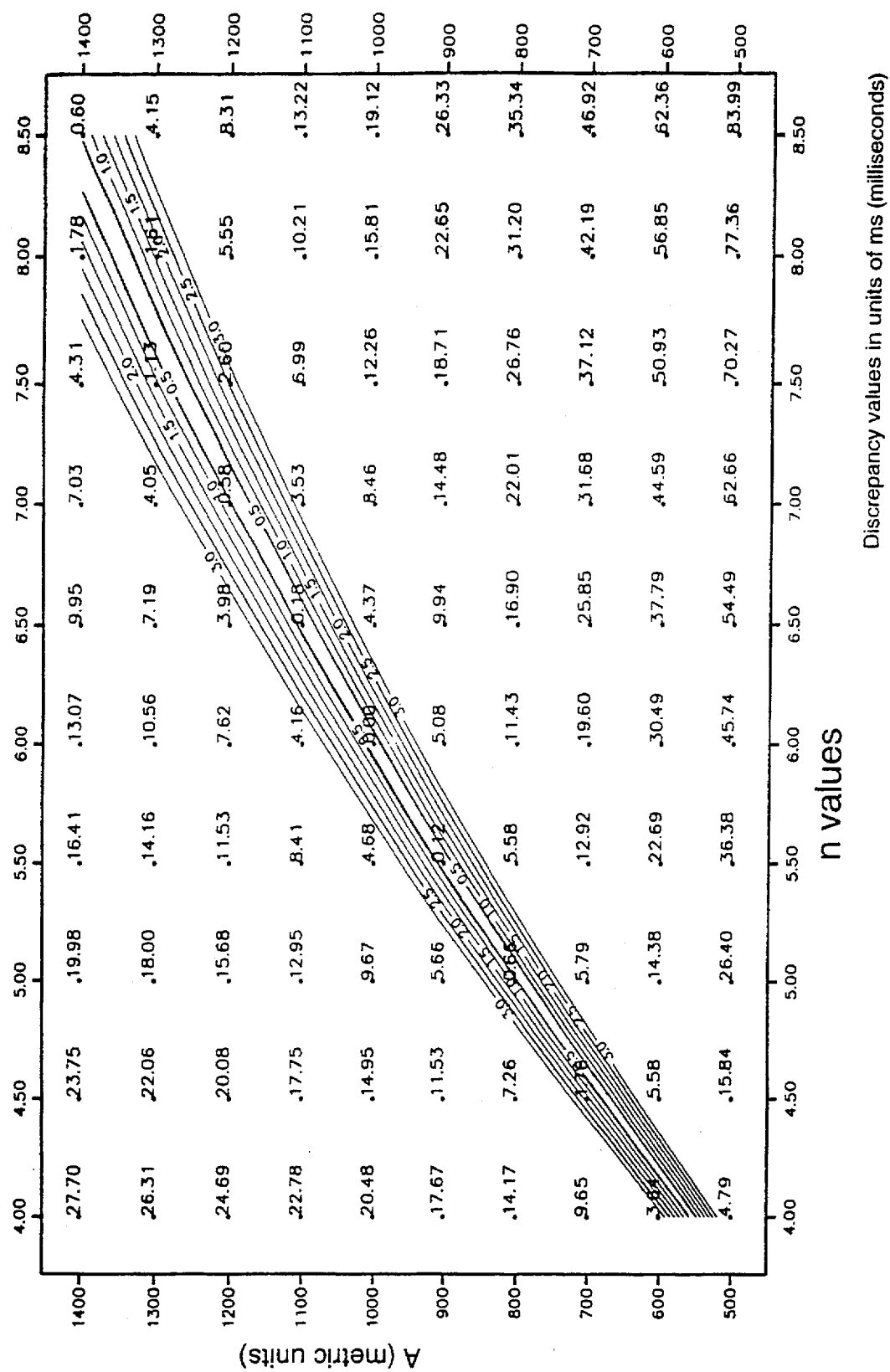

The above considerations hold for any set of parameters to varying degrees, depending on the specific formulation. Consider a theoretical example of a unit, 500 m thick with its top at 1000 m subsurface and in which the instantaneous velocity varies in accordance with Faust relationship, A=1000 (metric) and n=6. FIG. 5 shows a grid/contour display of the values of F(A,n), calculated as in the equation used to produce FIGS. 3 and 4. As in FIG. 3, the only combination of A and n values that produces an exact fit are the true values at A=1000 units and n=6 while the substantial non-uniqueness, within only 0.5 ms average discrepancy tolerance, is quite evident.

Figure 6:
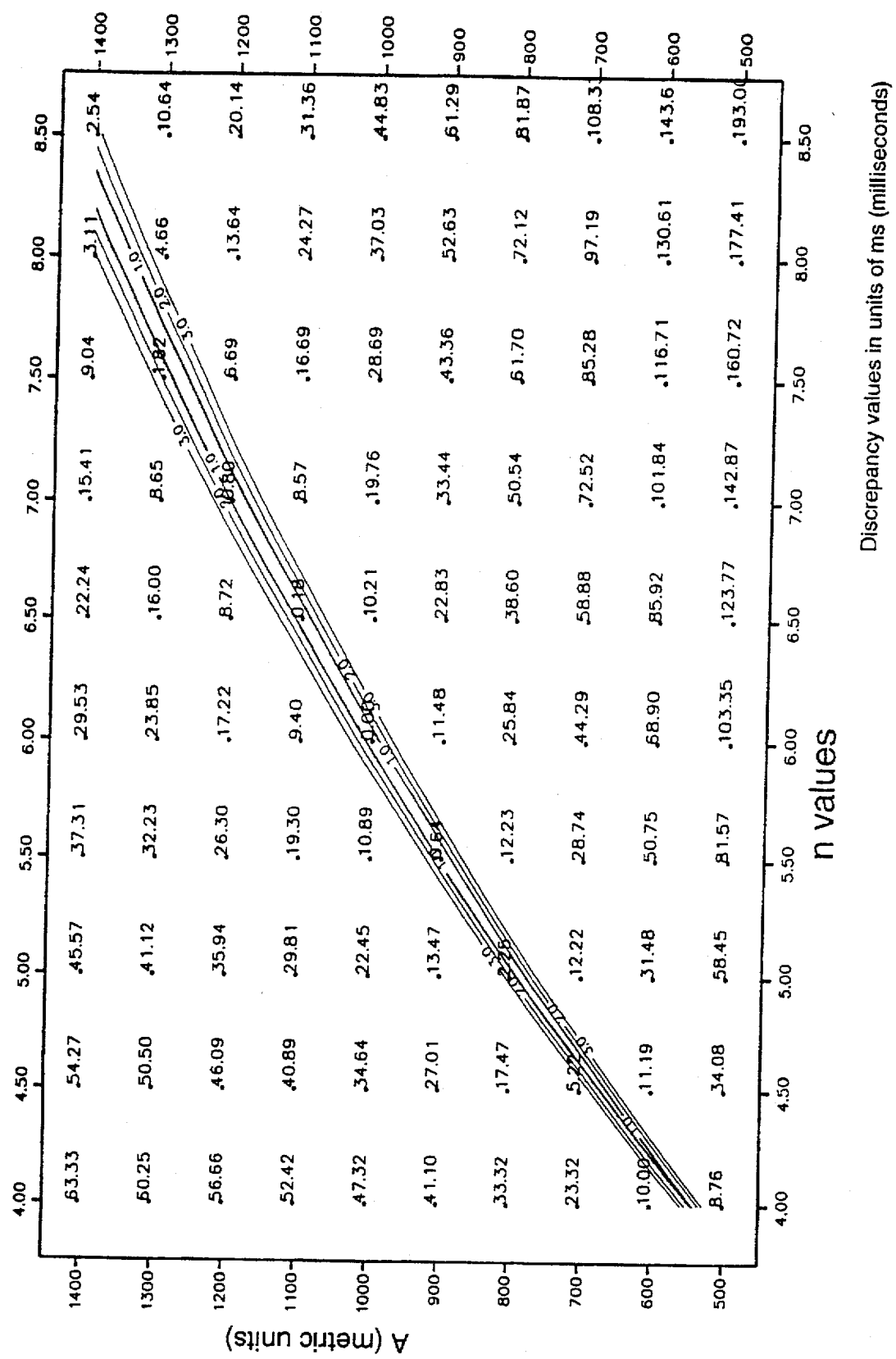

FIG. 6 corresponds to the same data as in FIG. 5 but with the curve length now increased from 500 m to 1200 m. There is a clear shrinkage in the extent of non-uniqueness as a result of the increase in curve length.

It should be noted that the non-uniqueness discussed in this section can be turned to great advantage in function construction, as will be detailed below.

Examples of Function Generation Options

The present invention encompasses many options for generating velocity function parameters on the basis of the aspects presented above. The options listed below represent specific examples. They will be described now for function fitting in the time-depth domain. In describing these options, the following will be implied: (a) The time-depth data sets have already been divided according to individual units, i.e. the function being generated refers to a specific unit. (b) When different observed time versus depth curves are translated along the time axis relative to one another the translation is carried out to an optimum fit position. (c) Each value of discrepancy between the observed time versus depth curve (single or combined) and the time versus depth curve corresponding to a given velocity versus depth function is obtained after translating the observed curve along the time axis to an optimum fit position.

Option 1: Contour Overlap (Multi-Display of Contours): This option is best suited for functions that have two parameters, e.g. $V_0$ and k in the linear case, A and n in the case of Faust relationship, etc.

In this option a contour display, similar to those presented above is generated individually for each observed time vs depth curve in turn. To produce each display, one parameter is varied along one axis while the other parameter is varied along the other axis. At each parameter combination, a discrepancy value between the calculated time vs depth curve corresponding to that combination and the observed curve is determined at the optimum position after translation. Contours of discrepancy values are then generated in this two-parameter space. The discrepancy function may be defined in accordance with any appropriate criterion. The choice of the contour (discrepancy) value that is considered to be acceptable for the pertinent observed curve depends on the details of the problem such as data accuracy, curve length, etc. This contour may be regarded as corresponding to the "maximum tolerance" value for that observed curve. The "maximum tolerance" value need not be the same for all the observed curves. Each point contained inside the contour of "maximum tolerance" corresponds to a function that fits the observed curve to better than the discrepancy value of the contour.

The "maximum tolerance" contours corresponding to the individual observed time vs depth curves are then superimposed such that the parameter axes coincide at the corresponding values on all displays. Each point in the zone of overlap between the "maximum tolerance" contours will then correspond to a function that fits all the time versus depth curves to better than the respective tolerance value of each curve.

In practice, once the overlap had been obtained, contours of successively lower discrepancy values could be attempted. This would cause the zone of overlap to shrink in size but, as long as the zone had not vanished completely, the points within this zone will correspond increasingly to closer fits with the observed time versus depth curves. Any point within this zone (such as a central point) can then be selected to represent the parameters for that unit.

Conversely, if one or more of the "maximum tolerance" contours do not overlap, the value of tolerance may be increased to test the level of tolerance required in order to obtain overlap. Such tests can help decide on the validity of certain assumptions, e.g. whether the data from the various wells/sources truly correspond to the same unit.

FIGS. 7 to 11 serve as an illustration. Each of FIGS. 7, 8, and 9 corresponds with an observed time versus depth curve. Each curve has been synthetically generated for a linear velocity function with $V_0$=2000 m/sec and k=1.0 sec$^{-1}$ and with random errors of ±1.0 ms maximum amplitude superimposed on the time values. A sampling interval of 20 m is used in all cases. The curves are designated Curves 1, 2 and 3 respectively. The other details are as follows: Curve 1: Depth range 800–1200 m. Shifts applied to the times, decreasing progressively from 0.0 ms at 800 m to −10 ms at 1200 m (to simulate shape distortion, i.e. a departure from a truly linear function). Curve 2: Depth range 1300–1900 m. Shifts applied to the times, increasing progressively from 0.0 ms at 1300 m to +12 ms at 1900 m (producing a distortion in the opposite direction to that of Curve 1)

Curve 3: Depth range 2000–2500 m. No shape modification.

Figure 7:
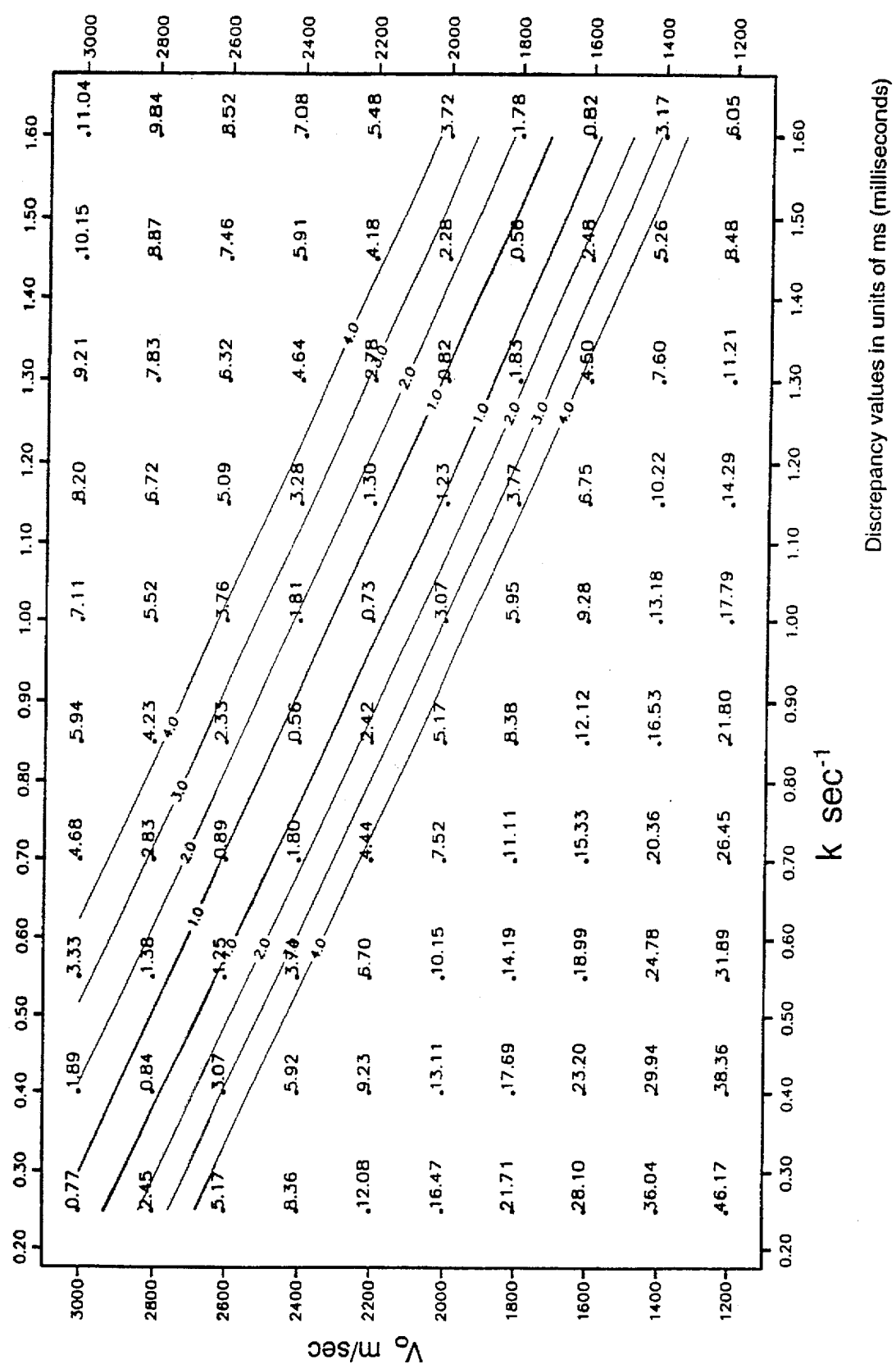
Figure 8:
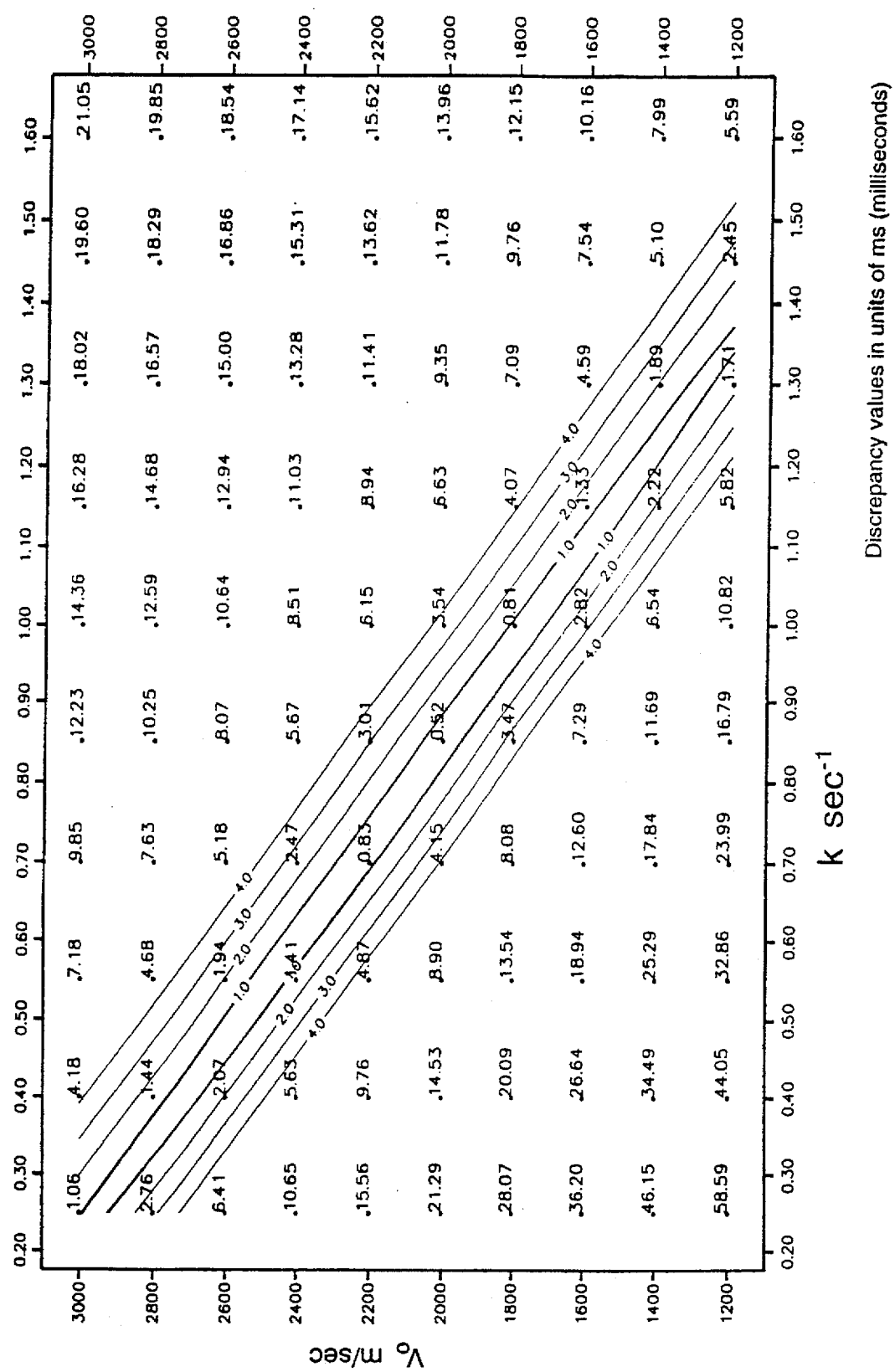
Figure 9:
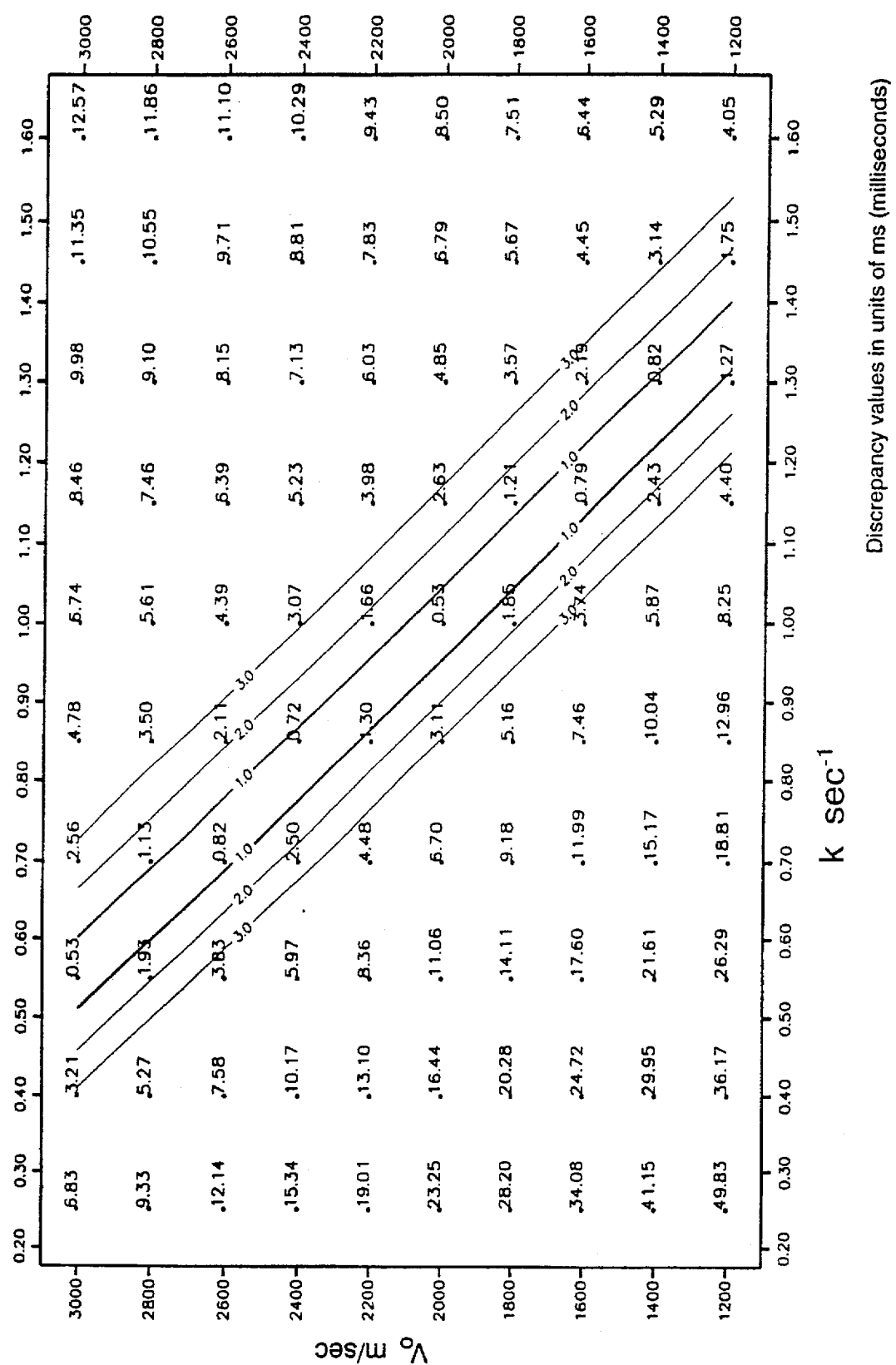
Figure 10:
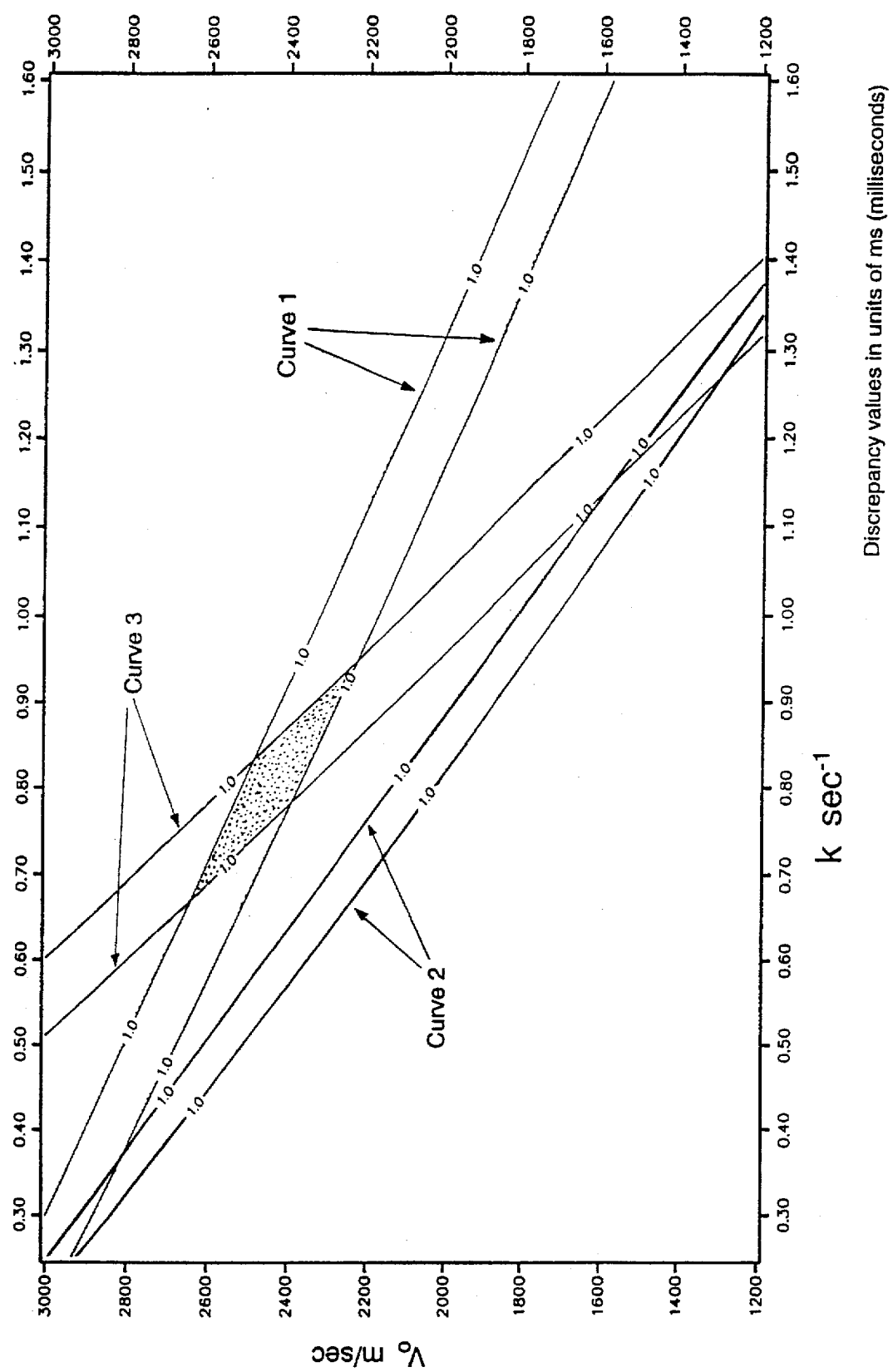
FIGS. 10 and 11 are plots of velocity vs. the reciprocal of time and superimposition for other illustrative examples of the present invention.

The 1 ms, 2 ms and 3 ms discrepancy contours are shown on all three displays (FIGS. 7, 8 and 9). A tolerance level of 2 ms produces considerable overlap between the contours of Curves 1 and 3. Reducing the tolerance to 1ms still preserves significant overlap. FIG. 10 shows a superimposition of the 1 ms contours of the three displays. The area of overlap between Curves 1 and 3 (dotted) delineates the region in the $V_0$, k space where every point would produce a function that fits both curves to better than 1 ms average discrepancy. If only these two curves were being considered then the parameters for the unit could be selected at the point $V_0$=2500 m/sec and k=0.75 sec$^{-1}$, for example.

Figure 11:
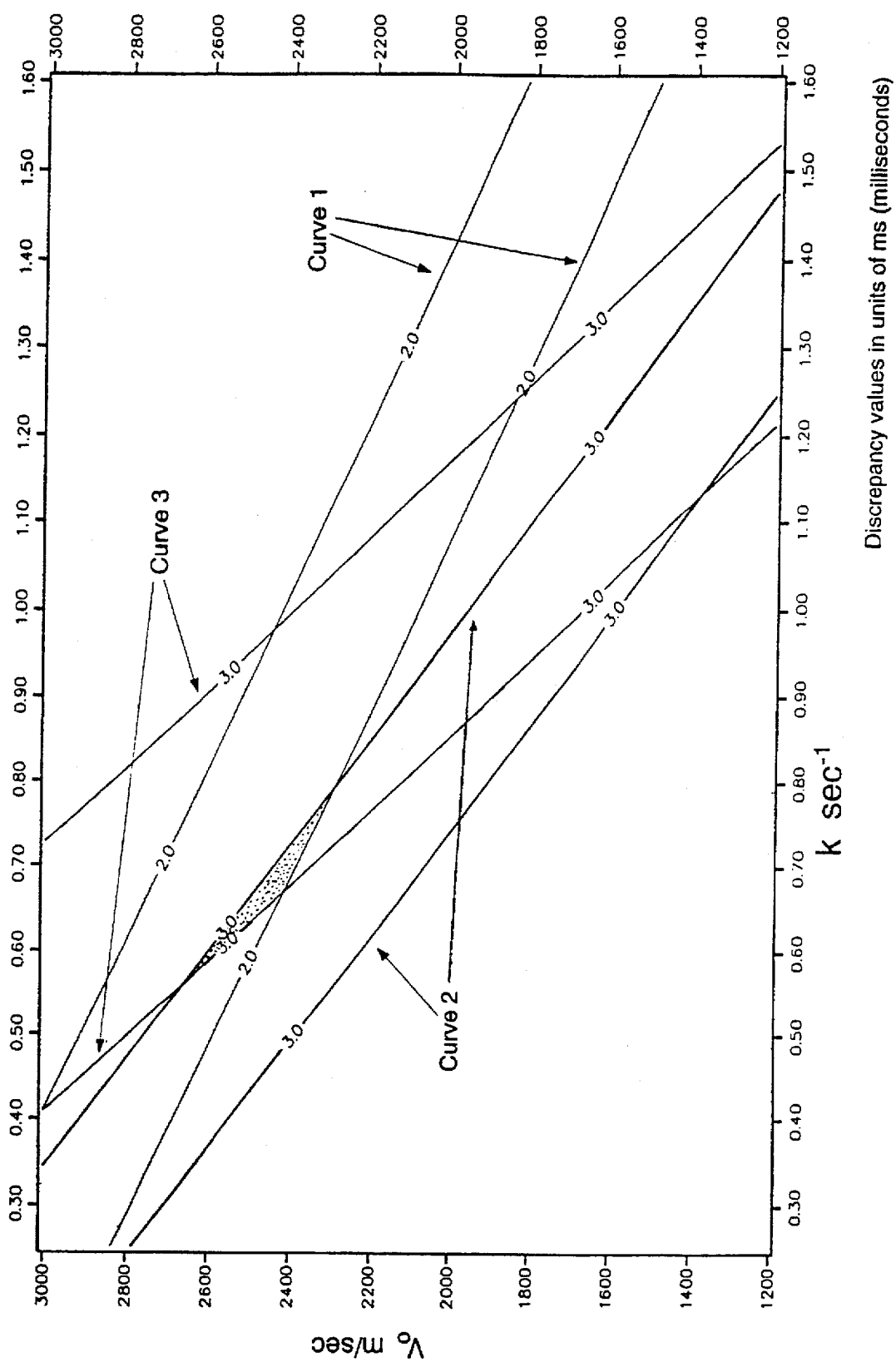

The 1 ms contour corresponding to Curve 2 does not overlap with the other two. In fact, a 2 ms tolerance level would still not produce an overlap. FIG. 11 shows a superimposition of the 3 ms contours corresponding to Curves 2 and 3 and the 2 ms contour corresponding to Curve 1. At this level of tolerance, there is overlap. If it is considered that this level of tolerance is acceptable for the particular data sets in hand then any point within the overlap area (dotted) would give suitable parameters for the unit. For example, the point $V_0$=2500 m/sec, k=0.65 sec$^{-1}$ may be selected as representing the parameters of the unit.

Option 2: Single Display of Contours: As in the previous option, this option is best suited for a function that depends on two parameters.

One way of producing a single display of contours could be achieved for example as follows: All the time versus depth curves are translated along the time axis until they fit optimally along their overlapping range in depth. If one curve does not overlap with the other(s) or if the overlap is not considered to be adequate then an appropriate function needs to be temporarily generated for that curve and extrapolated to produce the required overlap.

Obviously, if the entire data set consists of one curve only then no translation is applicable at this stage. Also, no translation is required if the observed data pertain to the top-most unit.

When the translation process is completed, the combined curves can be treated as a single curve. This curve will generally be multi-valued in time at every digitised depth point over the range of overlap. The curve will cover the same or greater depth range than any of the constituent curves. A contour display corresponding to this single composite curve is then produced, in a similar manner to those described above. The discrepancy function on which such display is based may for example be in the following form $$F = \left[ \sum_{j=1}^{r} \sum_{i(j)=1}^{m(j)} (T_{ij} - C_{i(j)})^2 \, W_j / N \right]^{1/2}$$

where r is the number of observed curves, m(j) is the number of points on the jth curve, N is the total number of all observed points being compared, $T_{ij}$ is the observed time, after translation, on the ith depth point of the jth curve, $C_{i(j)}$ is the function time at the ith depth point of the jth curve and $W_j$ is a weight assigned to the jth curve.

The parameter values are then chosen from within the region delineated by the contour of lowest discrepancy such as the parameter values at the point producing the lowest discrepancy value.

Figure 12:
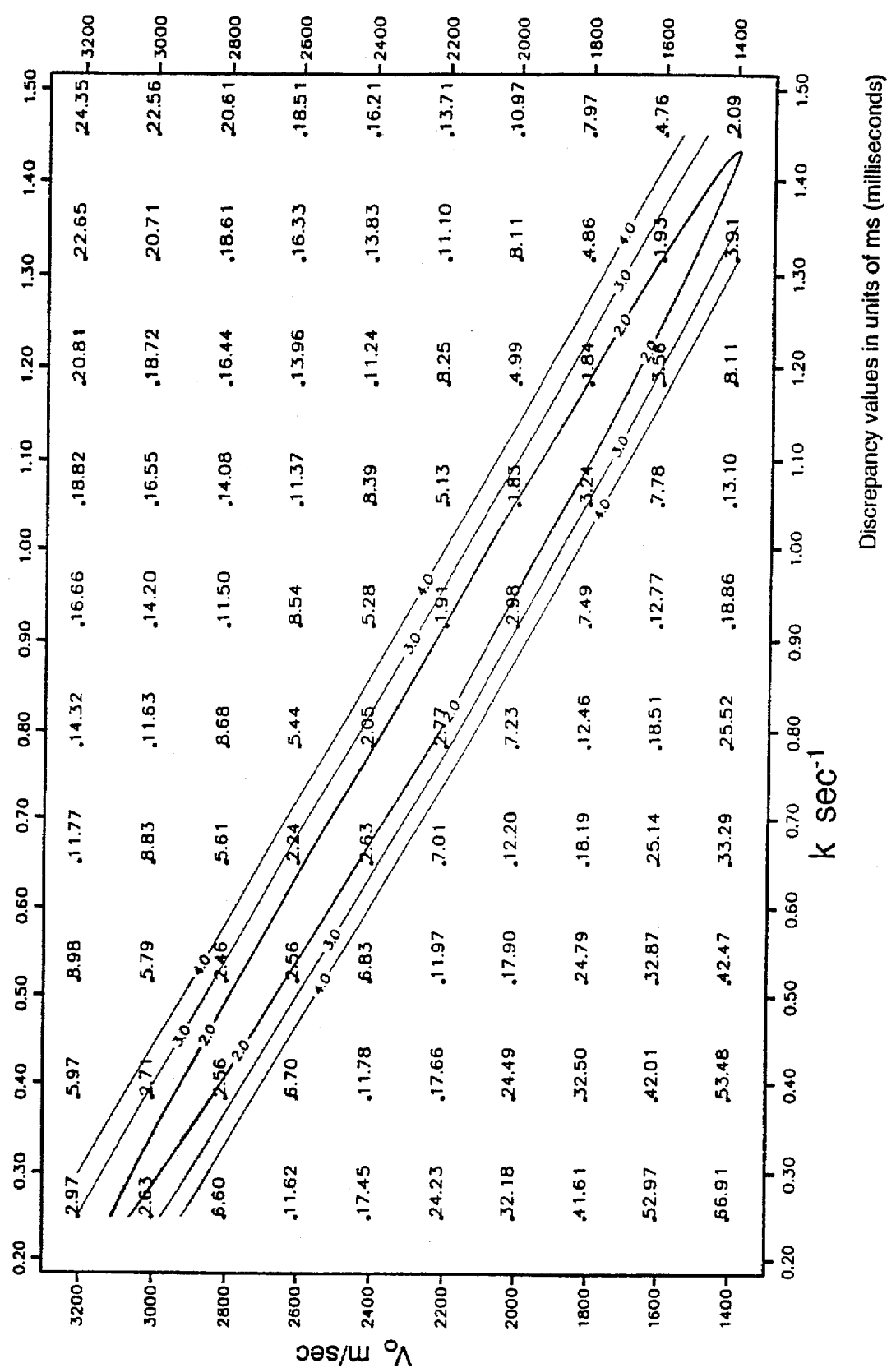

FIG. 12 is a grid/contour display based on a combination of the curves corresponding to FIGS. 4 and FIG. 8 (Curve 2). The two curves overlap over the depth interval of 1300 m and 1500 m. Both curves are weighted equally at 1.0. The total length of the combined curve is 900 m.

The increased length of the time-depth curve leads to a reduction in non-uniqueness (c.f. FIGS. 4 and 8). The discrepancy values along the main trough are higher than those in FIGS. 4 and 8. This is due to the distortion on Curve 2 which, unlike the situation on FIG. 8, must now also be accommodated by the somewhat different curve that corresponds to FIG. 4. Despite the distortion on Curve 2 and the imposed random errors, the discrepancy along the main trough is still reasonably low. For a choice of parameters of $V_0$=2200 m/sec and k=0.85 $sec^{-1}$, a fit with an average discrepancy of less than 2.0 ms is obtainable.

Another way of producing a single display of contours could be achieved for example without combining the curves. Each time versus depth curve is treated individually. For each curve one parameter is varied along one axis while the other parameter is varied along the other axis and a discrepancy value is worked out at each parameter combination. The discrepancy function may be of any appropriate form. The same range of parameter values is scanned for every time versus depth curve. For each parameter combination a value for the overall discrepancy is then calculated. This value could be represented for example by $$\left( \sum_{j=1}^{r} G_j W_j \right) / \left( r \sum_{j=1}^{r} W_j \right)$$

where $G_j$ is the discrepancy value corresponding to the jth time versus depth curve, $W_j$ is the weight assigned to the jth curve and r is number of observed time versus depth curves. A contour display of overall discrepancy values is then produced in the two-parameter space.

There is a possible third procedure that draws from the above two alternatives. This procedure consists of combining some of the curves to form one composite curve, other curves to form a second composite curve and so on. Each of the composite curves (and any curves that remain uncombined) can then be treated individually as a single curve. The overall discrepancy is then worked out at all parameter combinations and a single display of contours is then produced.

The three alternatives provide a useful choice, each alternative being more suited to a given field and geological setting than the other two.

Option 3: Direct Parameter Determination: This option can be used with any function, regardless of the number of parameters on which it depends. It is particularly suited to functions depending on more than two parameters.

One way of achieving direct parameter determination consists of translating the observed time versus depth curves along the time axis until they fit optimally between themselves to obtain a combined curve, in the manner described in Option 2 for the case involving curve translation. The parameters are then worked out directly from the composite curve without producing a visual display. The process normally involves the search for a minimum of an appropriate objective function. A suitable objective function would be in the form of a discrepancy function similar to that presented in Option 2 for the case of curve combination. The search process would usually be carried out through some form of optimization technique. The parameter combination corresponding to the minimum objective function would then be regarded as the required solution.

An alternative to the non-linear search is to scan a range of parameter values in a similar way to that used in the previous two options (but without producing a visual display). It can then select the parameter combination producing the least discrepancy value or could delimit the region in the parameter (hyper)space where the discrepancy values are within a specified discrepancy, for example. This alternative is suitable when the optimum parameter values are known fairly approximately. However, it becomes impractical when the number of parameters exceeds 3 in view of the large number of discrepancy evaluations that is needed.

The direct parameter determination process can also be carried out without combining the curves. Each of the observed time versus depth curves is treated individually. At each iteration during the optimization process, a time versus depth curve corresponding to the parameter combination at that iteration is generated (i.e. calculated). Each observed curve is then translated along the time axis to a best fit position with the calculated curve. The discrepancy between the calculated and each of the observed curves is then added in a similar manner to that used in the corresponding case of Option 2. The overall discrepancy would thus constitute the objective function. The optimization process continues in this way until convergence to an optimum has been achieved.

(B) FUNCTION DERIVATION IN THE VELOCITY-DEPTH DOMAIN

Figure 13:
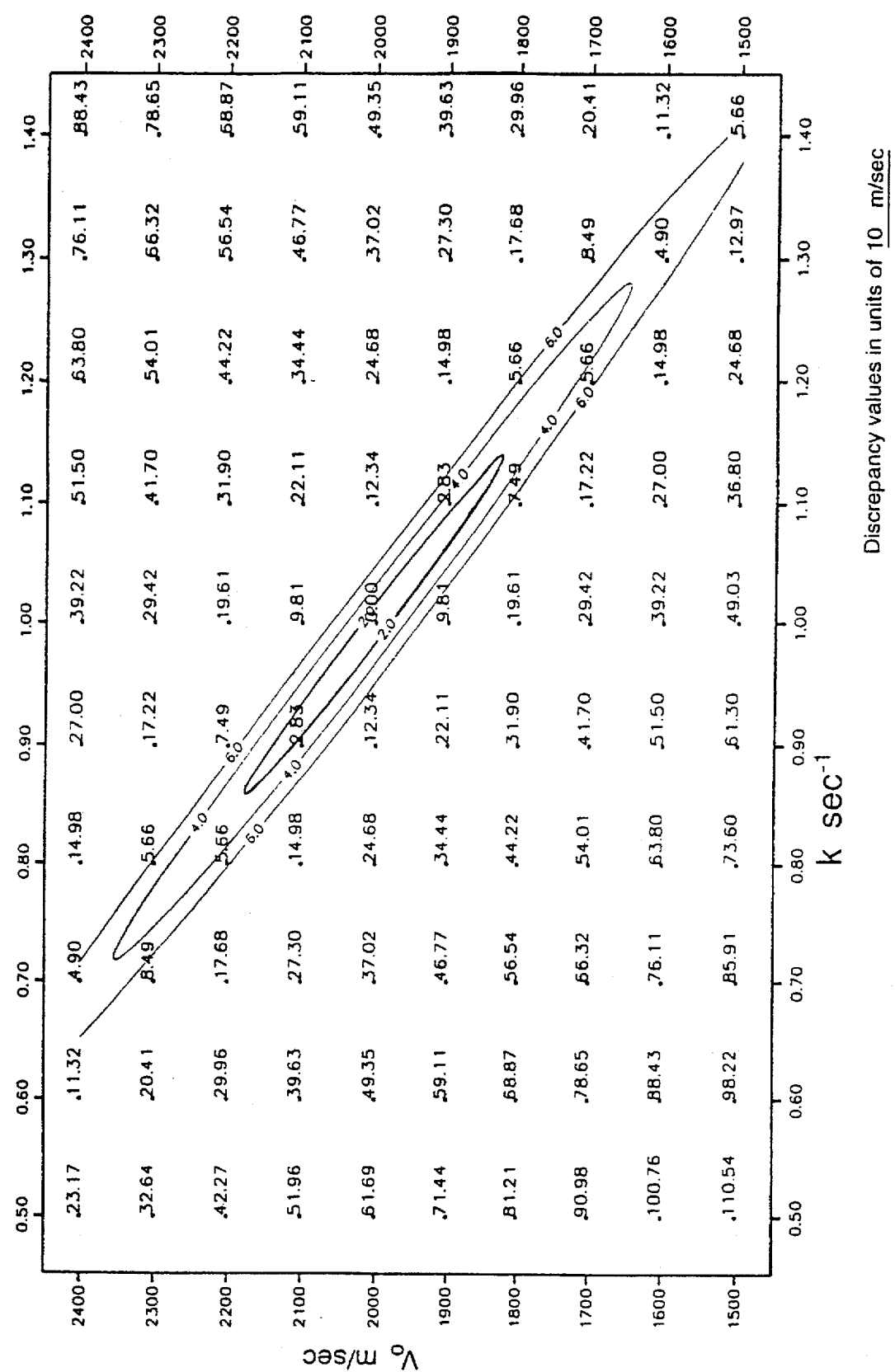

The general aspects discussed in connection with the time-depth domain apply to the velocity-depth domain. For example, let us take the case of the linear velocity versus depth function $$V_z = V_0 + kZ$$

the main symbols being as described earlier. Because of its particular formulation, this function corresponds to a straight line which has a slope equal to k and an intercept at Z=0 equal to $V_0$. FIG. 13 is based on the same data as FIG. 3 but is constructed in the velocity-depth domain. That is to say, the observed velocity-depth data pertain to an ideal unit in which the instantaneous velocity varies exactly linearly with depth with $V_0$=2000 m/sec and k=1.0 $sec^{-1}$, the unit being 500 m thick with its top 1000 m deep. FIG. 13 shows a grid/contour display of the average discrepancy between the input (observed) velocities and the straight line that corresponds to each particular combination of $V_0$ and k at each grid point. Non-uniqueness within a comparatively small level of tolerance is clearly displayed. Note also the exact symmetry in all straight line directions with respect to the exact solution at $V_0$=2000 m/sec and k=1.0 $sec^{-1}$, due to the particular form of this function.

Figure 14:
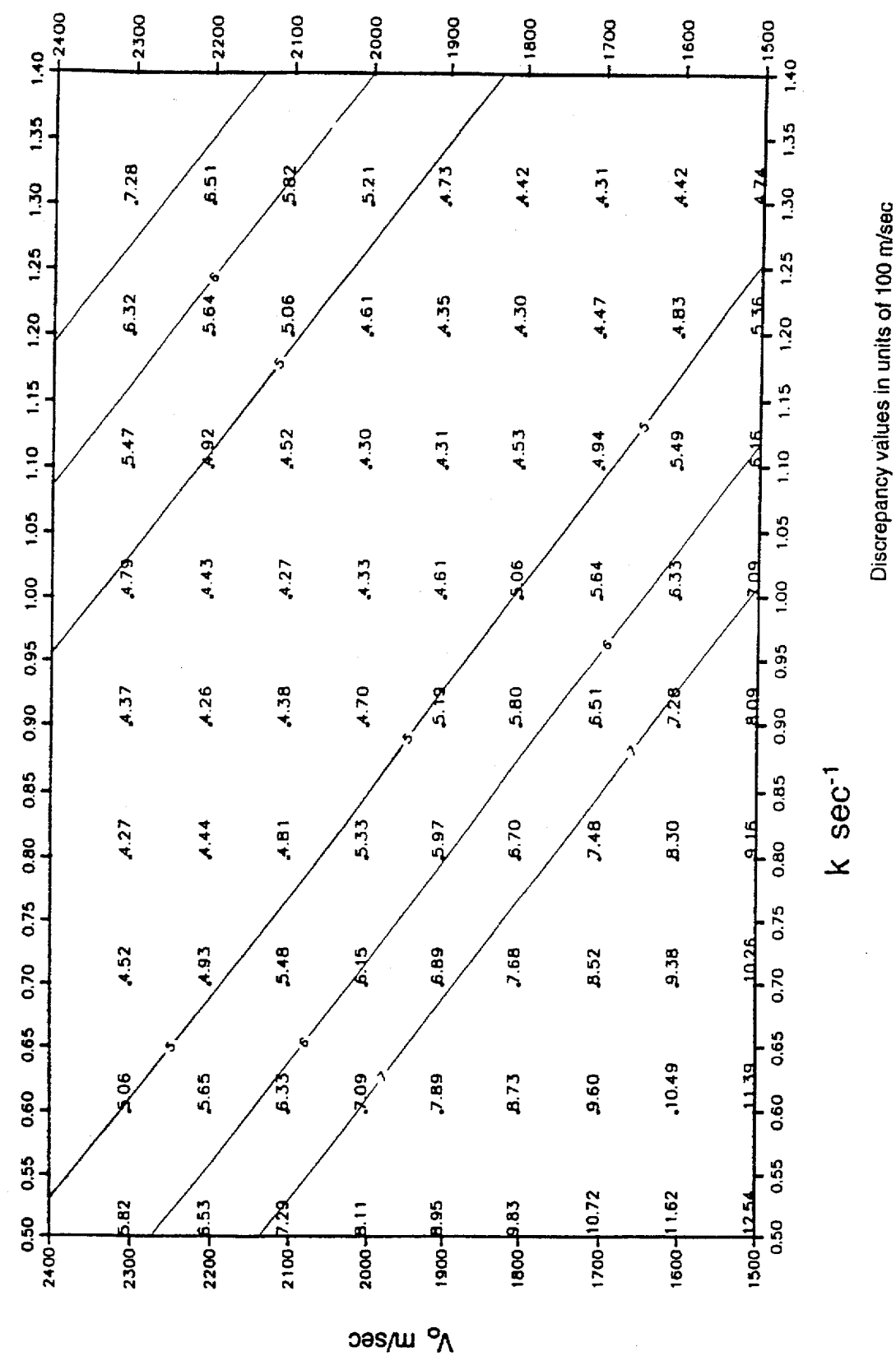

Under the ideal conditions of FIG. 13 it may seem that working in the velocity-depth domain should be at least as desirable as working in the time-depth domain. However, in practice, working in the velocity-depth domain is fraught with difficulties due to the rapidly fluctuating instantaneous velocity values in the familiar manner of a sonic log. FIG. 14 was produced, in the velocity-depth domain, after superimposing random errors of maximum amplitude of ±1.0 ms on the time data used in FIG. 13. As FIG. 14 shows, the addition of errors here has greatly increased the discrepancy level (note that the units of discrepancy are 10 times greater than those of FIG. 13). The addition of errors has also considerably flattened the solution trough. Clearly then, the derivation of parameters from this kind of data in this domain is quite unreliable. However, working in the velocity-depth domain is preferable to working in the time-depth domain in certain cases, such as when the available data are already in velocity-depth format and in which the velocity does not show significant flutter.

In the velocity-depth domain the discrepancy between the observed velocity versus depth data and the velocity versus depth function curve could again be given by any appropriate measure such as a weighted normalized sum of squares of residuals along the velocity or the depth axis. Unlike the case in the time-depth domain, in this domain, the generation of the velocity versus depth function does not require the translation of curves either between themselves or onto the function curve.

Otherwise, the application of all the options described in conjunction with the time-depth domain follows in a straightforward manner. For example, suppose that sonic data for a specific unit are available from a number of wells in an area. Suppose that an individual contour display (similar to that of FIG. 13) corresponding to each well is produced in the velocity-depth domain. In this case, the contour overlap procedure (Option 1) can be applied in the same way as that used in the time-depth domain. If, instead of treating the wells individually, the velocity versus depth data from all the wells are considered as part of the same data set then a single contour display (Option 2) can be produced. The function can also be generated simply in Option 3 through a linear regression fit of the observed data onto the function curve (a straight line in this case); the function parameters in this case being given directly by the intercept and slope of the straight line.

(C) FUNCTION DERIVATION IN THE VELOCITY-TIME DOMAIN

Function generation in this domain can be useful for example when the observed data are already in the form of velocity versus time data such that might be obtained from a seismic reflection survey.

If the observed data are not in the form of velocity versus time data then they should be transformed to this form. Similarly, the function curve should be calculated in this form. The travel time is measured either from the surface or from some other reference datum.

As in the case of the time-depth domain, for a unit below the top-most unit, any time shift between the different observed curves is attributable to differences in travel time outside the unit itself. Thus, the observed curves could be translated along the time axis relative to one another and relative to the function curve.

The generation of the velocity versus depth function proceeds in this domain in the same way as in the case of the time-depth domain: The translation of the observed curves along the time axis to fit optimally between themselves (if curve combination is required) and with the function curve, is carried out as appropriate. Any suitable measure of discrepancy between the observed data and the calculated function curve may be used. Options 1, 2 and 3 can be used in the same way as described in the case of the time-depth domain.

MISCELLANEOUS COMMENTS

The choice of the function form to be adopted for a given area is primarily a question of how well would such function fit the data. In the case where only one time vs depth data set is available, the main criterion is the magnitude of discrepancy produced by the best fitting function, in that function form. For example, suppose that a time vs depth curve for a particular unit in a particular area can be fitted to a specific Faust function to within a discrepancy of 1 ms. Suppose that the curve could not be fitted to other tested functions including the linear velocity function to better than 3 ms. Clearly, in this case, the Faust relationship would be the more suitable function form. In the case of more than one data set, other considerations come into play, e.g. if using Option 1, the function form ought to be that which produces a contour overlap at a reasonable discrepancy level that cannot be improved upon with the use of another function form; if using Option 2, the function form should produce a better overall discrepancy than if another function form was used, etc.

Option 1 is an extremely efficient and versatile option. It can also be useful in indicating the possibility of lateral changes in the unit. Option 2 works particularly well in areas where the unit does not suffer significant lateral changes. Both Options 1 and 2 are highly suited to interactive workstation and PC applications. They are also suited to non-interactive environment, especially Option 2. Option 3 does not enjoy the overview and control of Options 1 and 2. However, it can be readily automated for non-interactive use. It is also the obvious choice when the formulation involves more than two parameters.

In the parameter determination process the above or similar options as well as the domains used may be combined as appropriate, providing that the parameters being estimated refer to the same function form. For example, consider a situation where seismic reflection data and sonic data from two wells are the only available data in a given area. Suppose that the reflection data are used in the velocity-depth domain to produce a contour display via the single contour display option. Suppose also that the sonic data are used in the contour overlap option via the time-depth domain. In this case the contour display from the reflection data could be used in conjunction with the sonic data for an overall parameter determination through the contour overlap option.

The present invention includes all situations where the time-depth, velocity-depth, velocity-time, slowness-depth or slowness-time data used in generating the function are subjected to various corrections to allow for such factors as dip, structural configuration, changes in the depth of burial (reduced overburden), overpressuring, datum changes, lithological changes, etc. The various procedures given in the present invention can be adapted, if need be, to suit the requirements of each of these problems. As an example, consider for a given unit a time-depth data set from a certain well. Suppose that the unit at the well location is known to have undergone a reduction in overburden of, say, 800 m, with respect to its maximum past depth of burial. In this case, 800 m can be added to each depth value in the data set (with a possible further adjustment for decompaction). The corrected time-depth data set can then be used in function generation. If the amount of overburden reduction is not known then an application of the multi contour display for example can help to estimate that amount. In fact, the procedures described in the present invention provide the possibility to estimate the relative uplift or relative overburden changes for a given unit between any two locations for which velocity data are available.

Another example of adapting the above procedures relates to depth reference level or datum. In the description of the present invention, depth was referred to the surface. However, the presented methodologies apply equally to cases where the depth is referred to some other level such as sea level, sea bed, or the top of a particular unit. The only adaptation that is required in such cases is to adjust the depths by subtracting or adding an appropriate value. (Although in the majority of cases in practice, the depth should be referred to the ground surface, there are certain applications where reference to some other level simplifies the treatment whilst still remaining within the accuracy requirements of the problem.)

APPENDIX 1

GENERATION OF NUMERICAL TIME VERSUS DEPTH AND VELOCITY VERSUS DEPTH FUNCTIONS

For the present purpose, a numerical function means one that is defined by a series of discrete time versus depth, velocity versus depth or velocity versus time points. The velocity is defined as being dependent on depth (but not on travel time below the top-most unit) but no assumption is made as to whether the variation of velocity with depth follows any systematic or unsystematic pattern—The rare case where velocity is defined as being dependent on travel time (but not on depth) is briefly covered in discussing function generation in the velocity-time domain. As in the case of analytical functions, the term velocity will be used in the case of numerical functions mainly in the sense of instantaneous velocity but will also encompass cases where the interval to which the velocity refers is relatively coarse, i.e. the velocity is interval rather than instantaneous velocity. The equivalence of average velocity and slowness (instantaneous, interval and average) will also be implied. It will be assumed that the input observed data pertain to the same unit. The term curve will be used to denote a curve in the conventional sense or a set of data points with or without a curve joining them. The preferred form of the function is a time versus depth function.

Function Generation in the Time-Depth Domain

The procedure works on time versus depth data. Well sonic data should preferably be sampled at sufficiently frequent intervals to provide adequate representation of the variation of the velocity in the ground (e.g. at 1 foot intervals). Data from seismic reflection sources (usually given in velocity versus time values) should be suitably transformed before input. The generated function is then given by the set of time versus depth values that best fit the translated curves in accordance with a suitable goodness-of-fit criterion. The following is an example of how the generation of the function might be carried out:

1. If the data pertain to the top-most unit, the time versus depth curves from various wells and other sources (the observed curves) should be fairly coincident. No curve translation is required in this unit. The numerical function may then be generated in the form of a time versus depth data set which best fits the translated data for example on the basis of a weighted least squares criterion.

If all the observed curves are sampled at the same depths then the time versus depth function curve should preferably be sampled at those same depth values. If the observed curves are not sampled at the same depths then some form of interpolation, such as a linear interpolation, will be needed.

If the observed time versus depth curves are significantly divergent then that may indicate lateral variation in the unit or large measurement errors. In such cases, a numerical function for this top-most unit cannot be reliably generated.

2. In the case of deeper units than the top-most unit, the observed curves are translated along the time axis relative to one another until an optimum fit is obtained between the translated curves. The translation may be carried out in any order such as in order of curve length. The goodness-of-fit criterion could be for example least squares along the time axis. FIG. 15 shows schematically three observed curves in the translated position.

3. If the curves do not overlap adequately (e.g. have only an overlap over a depth range equal to 10% of the length of the shorter curve) or do not overlap at all then an analytical function curve (e.g. one corresponding to Faust relationship) is used. This curve is fitted to either the stationary curve (or curves) or to the curve being translated or to both. The fitted curve is then extrapolated according to this function so as to produce adequate overlap (e.g. 50% of the length of the shorter curve).

4. The numerical function may then be generated in the form of a time versus depth data set which best fits the translated data on the basis of, for example, a weighted least squares criterion. The same considerations regarding the depths at which the observed curves are sampled apply as in the case of the top-most layer. The generated function is shown schematically in FIG. 15.

Figure 1:
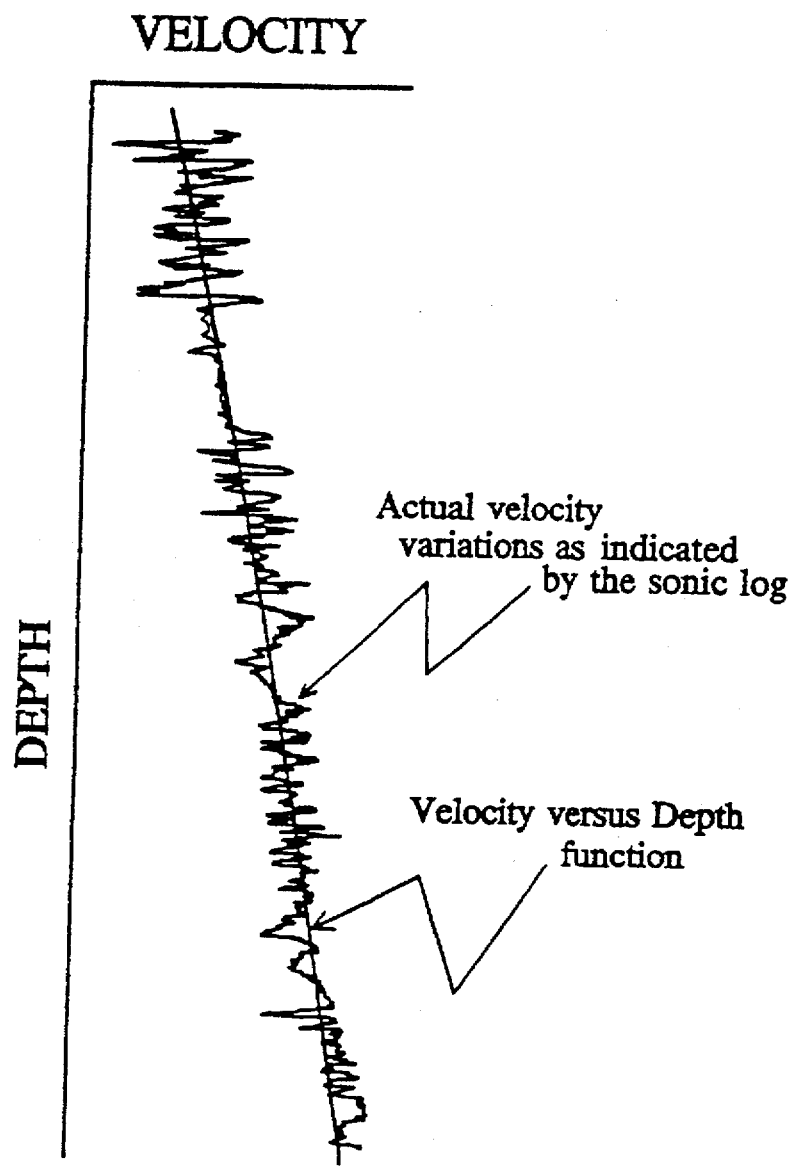
FIG. 1 is a schematic representation of the variation of instantaneous velocity with depth as explained already.

It should be noted that abrupt breaks can occur in the function at the extremity points of each curve as the curve starts to be included in the averaging process at its shallow extremity or finishes from being included in the averaging process at its deep extremity. This is shown schematically in FIG. 1 i5=. These kinks may be smoothed out through the application of a suitable spline fit or by distributing the magnitude of the breaks both upwards and downwards in a gradual manner. In all cases, the smoothing should ensure that successively deeper points have increasing time values in order to avoid the implied negative velocity otherwise.

Function Generation in the Velocity-Depth Domain

The procedure works on velocity versus depth data. No curve translation is applicable in this domain. The generated function is given by a set of velocity versus depth values that best fit the observed curves in accordance with a suitable goodness-of-fit criterion. The following is an example of how the function generation might be carried out:

1. At each depth point, a weighted average of all the velocity values occurring at that depth is calculated—The number of velocity values occurring at each depth point is equal to the number of curves straddling that depth point. The average value becomes the function value at that depth. As in the case of function generation in the time-depth domain, interpolation may be required if the observed curves are not all sampled at the same depth values.
2. The generated function is then represented by the series of velocity-depth points that were derived in the previous step.
3. If there are depth ranges that are not covered by any curve then the gap can be bridged up for example by joining the deepest function point on the shallower segment with the shallowest function point on the deeper segment. The two points could be joined with a straight line or some other form of line as judged to be appropriate.

Function Generation in the Velocity-Time Domain

The procedure works on velocity versus time data such as data which might be obtained from seismic reflection sources. The generated function is given by a set of velocity versus time values that best fit the observed curves in accordance with a suitable goodness-of-fit criterion. If the velocity is defined as being dependent on depth (but not on travel time) then the following is an example of how the function generation might be carried out in this domain:
1. As in the case of the time-depth domain, no curve translation is applicable in the top-most unit. Below that unit, time shifts between the different observed curves are attributable to differences in travel time outside the unit for which the function is being generated. These curves are then translated along the time axis relative to one another until an optimum fit between them is achieved.
2. At each time point, a weighted average of all the velocity values occurring at that time is calculated—The number of velocity values occurring at each time point is equal to the number of curves straddling that time point. The average value becomes the function value at that time. As in the case of function generation in the time-depth domain, interpolation may be required if the observed curves are not all sampled at the same depth values.
3. The generated function is then represented by a series of velocity-time points that were derived in the previous step.
4. Gaps (i.e. time ranges not covered by any curve) can be bridged up by a suitable form of line joining the deepest function on the shallow segment and the shallowest function point on the deep segment.

In the rare case where the velocity is defined as being dependent on travel time (but not on depth) no curve translation will be applicable in any of the units. Otherwise, the function is generated as in steps 2 to 4 above.

APPENDIX 2

VELOCITY FUNCTION GENERATION FROM DATA OBTAINED OVER COARSE INTERVALS (REFLECTION AND WELL SHOOT DATA AS EXAMPLES)

Seismic reflection data constitute the main source of interval velocity information in seismic work. The basic quantity is that obtained from the maximum coherency between the seismic reflections when the seismic traces are stacked. This quantity is known in the geophysical literature as stacking velocity. The stacking velocity data need to be corrected for various factors in order that the data should provide realistic estimates of the velocity in various intervals in the ground upon further analysis. Interval velocity data may also be obtained through such geophysical techniques as modeling and imaging on 2D and 3D data sets. Generally, velocities from such processes require fewer corrections than stacking velocity data. In stacking velocity work, a unit typically consists of between one and six intervals. Each interval is typically between 100 m and 700 m in thickness.

Well calibration surveys and vertical seismic profiling techniques are examples of techniques that produce direct time versus depth data from which interval velocities can also be derived. These techniques usually work by letting off acoustic energy from a source (such as dynamite or an air gun) at the surface and recording the signal and travel time at a succession of levels down a well using one or more receiver(s)—Sometimes the source and receiver positions are reversed. Each depth level can be regarded as delineating the base of the interval above and the top of the interval beneath that level. The data obtained from such techniques will be generically referred to as well shoot data.

The data obtained over coarse intervals will be collectively referred to as coarse interval data. Function generation will refer to the generation of velocity (or implied slowness) versus depth functions. Velocity versus time functions are dealt with in Appendix 3.

Function Generation in the Time-Depth Domain

Interval velocities from reflection data are usually available in the form of velocity-time data pairs. Time-depth data pairs can be generated from this data set using basic principles, the depth to the base of the mth interval, $D_m$, being given by $$D_m = \sum_{i=1}^{m} V_i(T_i - T_{i-1})$$

where $V_i$ is the interval velocity in the ith interval and $T_{i-1}$ and $T_i$ are the travel times to the top and base of the ith interval.

Well shoot data are usually directly available as time versus depth data.

For a given unit, each time versus depth data set, whether from surface reflection data, from a well shoot or from other sources, can be treated in the same way as time versus depth data originating from sonic logs which are usually much more finely sampled. The coarse interval data can therefore be used in any appropriate combination, with or without sonic logs, to generate the function through, for example, Options 1, 2 or 3 as described in the text. However, a preferred procedure in the case of a two-parameter function (e.g. $V_0$ and k in the linear case), is as follows:

Use the coarse interval data to produce a single contour display (Option 2) based on the alternative whereby the observed curves are compared individually (not combined) with the calculated function curve. This display can then be used in a contour overlap approach (Option 1) in conjunction with finely sampled data or with other single contour displays from determinations in the velocity-depth domain for example. If there are no finely sampled data or other single contour displays then the function generation process is regarded as complete; the function parameters can be selected from the display as appropriate.

Function Generation in the Velocity-Depth Domain

This domain is particularly suitable for generating functions that have a simpler velocity-depth form than a time-depth form.

For interval velocities from reflection data it is preferable to assign the interval velocity value of each interval to the mid point of that interval and to treat it as the instantaneous velocity value at the corresponding depth. The depth to the mid point of the mth interval, $D_{mid}$, being given by $$D_{mid} = 0.5\, V_m(T_m - T_{m-1}) + \sum_{i=1}^{m-1} V_i(T_i - T_{i-1})$$

where $V_m$ and $V_i$ are the interval velocities in the mth and ith intervals, $T_{m-1}$ and $T_m$ the travel times to the top and base of the mth interval and $T_{i-1}$ and $T_i$ the travel times to the top and base of the ith interval.

For well shoot data, the velocity in each interval is obtained from the interval thickness (difference between the depths below and above the interval) divided by the transit time (difference between the travel time to the base and top of the interval). Again, it is preferable to assign this velocity value to the mid point of the respective interval and to treat it as the instantaneous velocity value at the corresponding depth.

For a given unit, each velocity versus depth data set, whether from surface reflection data, from a well shoot or from other sources, can be treated in the same way as velocity versus depth data originating from sonic logs. The coarse interval data can therefore be used in any appropriate combination, with or without sonic logs, to derive the function through, for example, Options 1, 2 or 3 as described in the main text.

Function Generation in the Velocity-Time Domain

Working in this domain is useful for interval velocity data from reflection surveys which are usually available in a velocity-time form and do not require transforming.

For a unit below the top-most unit, any time shift between the different observed curves is attributable to differences in travel time outside the unit itself. Thus, the observed curves can be translated along the time axis relative to one another and relative to the function curve as necessary.

The function generation process can follow the same procedure described in the main text under generation in the velocity-time domain. The preferred procedure is that followed in the case of time-depth domain generation described in this Appendix.

APPENDIX 3

THE GENERATION OF VELOCITY VERSUS TIME FUNCTIONS

Instantaneous velocity as a function of travel time is difficult to justify geologically (apart from the top-most unit where the absolute travel time is related to depth through the instantaneous velocity). The use of velocity versus time functions in geophysics stems mainly from the mathematical convenience of the formulation since the time-depth relationship is generally simpler to derive from this type of function than from the velocity versus depth function.

In the generation of velocity versus time functions no translation of curves along the time axis is applicable in any of the generation domains. This is because such a translation would invalidate the generation process as the velocity is defined as being a function of travel time. Apart from this constraint, the generation process follows the same general methodology presented in the main text for the case of velocity versus depth functions. Any suitable measure of discrepancy between the observed data and the calculated function curve may be used in any of the domains. Options 1, 2 and 3 can be used as required. The generation of the linear velocity versus time function in the velocity-time domain can be used as an example. This function has the form $$V_T = W_0 + aT$$

where $V_T$ is the instantaneous velocity at time T and $W_0$ and a are the function parameters. The function corresponds to a straight line that has an intercept at T=0 equal to $W_0$ and a slope equal to a. A contour display of discrepancies can be produced over scanned ranges of $W_0$ and a values. Options 1 and 2 can be used as required. Generating the function through Option 3 can be carried out by means of a linear regression fit of the observed data onto the function curve (a straight line in this case), the function parameters being given directly by the intercept and slope of the regression function curve.

APPENDIX 4

THE SLOWNESS FUNCTIONS AND DOMAINS

The term slowness is used in seismic work to denote the reciprocal of velocity. It is not a widely used term. To date, slowness has been used in problems involving certain inverse problems such as seismic tomographic inversion. The use of slowness versus depth functions to provide possible alternative to velocity versus depth functions is a totally novel concept introduced in the present invention. In the present Appendix, the term slowness will be used mainly in the sense of instantaneous slowness but will also include interval slowness where appropriate. Also, the term slowness function will be used in the sense of slowness versus depth function unless stated otherwise.

The scope of application of slowness functions is exactly the same as those of velocity functions, that is, mainly for converting seismic times to depths and for various geological investigations like reduced overburden and lithological or facies changes. Indeed, all of the aspects described in connection with velocity functions apply to slowness functions in the same way apart from the fact that velocity and slowness are the reciprocal of one another. The reason for introducing and highlighting slowness in the present invention is that it significantly widens the range of possible functions that are available to the geophysicist. Slowness as a function of depth is fully supportable geologically on the same basis as the velocity versus depth function. This aspect, combined with the ease of mathematical manipulation of slowness versus depth functions, makes it possible to effect the above applications very accurately and conveniently through the use of quite versatile slowness versus depth functions.

Examples of slowness functions and the corresponding time-depth relationships are given below (Z and T represent depth and time respectively).

$$S_z\left(= \frac{dT}{dZ}\right)$$

is instantaneous slowness. The remaining symbols are function parameters):

(a) The polynomial: $S_z = A + BZ + CZ^2 + \ldots$ $$T = AZ + \frac{1}{2} BZ^2 + \frac{1}{3} CZ^3 + \ldots$$

(b) The linear form (Special case  $S_z = S_0 - gZ$ of the polynomial)  $T = S_0 Z - \frac{1}{2} gZ^2$ (c) The inverse power form  $S_z = S_0 - QZ^{1/n}$ $$T = S_0 Z - \frac{n}{1+n} QZ^{(1+n)/n}$$

The above functions are quite versatile and useful while their corresponding time-depth relationships are simple in form and easy to derive. Thus, functions forms that are quite intractable for velocity versus depth functions can be used in the slowness approach, making it possible to simulate a wide range of ways in which the velocity varies in the ground.

The generation of the slowness function in the time-depth domain involves producing the function curves through the time-depth relationship corresponding to the function being generated. This step is identical to that in the case of velocity versus depth function generation. The remainder of the generation methodology, including the use of Options 1, 2 and 3 is also identical.

The procedure for generating the slowness function in the other domains (velocity-depth, velocity-time, slowness-depth, slowness-time) differs from that for generating the velocity versus depth function only in the trivial transformation (taking the reciprocal) if the slowness versus depth function is generated in a velocity domain or the velocity versus depth function is generated in a slowness domain. Otherwise, the methodology is again identical to that in generating the velocity versus depth function.

For example, let us consider the linear slowness function shown above. In the slowness-depth domain the function curve is a straight line that has an intercept at Z=0 equal to $S_0$ and a slope equal to $-g$. The discrepancy between this line and the observed curve or curves for the unit for which the function is being generated can be measured by any appropriate goodness-of-fit criterion. A contour display of discrepancies can be produced over the scanned ranges of $S_0$ and g values. Options 1 and 2 can be used as required. The contour overlap option can have a combination of displays generated through different domains. Generating the function through Option 3 can be carried out by means of a linear regression fit of the observed data onto the function straight line. The function parameters are then given directly by the intercept and slope of the regression line.

Generation of the same function in the velocity-depth domain for example would require function transformation to $$V_Z = [S_0 - gZ]^{-1}$$

and the function curve will no longer be a straight line.

The requirement for generating velocity functions in slowness domains or slowness functions in velocity domains is likely to arise in special cases where the particular function formulation renders it more suitable for generation that way.

Slowness versus time functions have no analytical advantages over other functions nor are they geologically justifiable. Their use is likely to be only for special applications where the ground down to the horizon of interest is treated as being one unit. The generation of slowness versus time functions follows the same methodology as in generating velocity versus time functions with function transformation being carried out to be compatible with the domain in which the function is being generated.

I claim:

1. A method of determining, from well sonic data and/or seismic data resulting from sonic/seismic pulses derived at one or more locations, the parameters of a mathematical function representing the variation with depth of a velocity-related quantity associated with properties of the ground below the surface to thereby provide information relating to geological or related aspects of ground structure, the method comprising responding to the data to construct representations of degree of fit of said data in parameter space relating to the mathematical function.

2. The method of claim 1 wherein, in the case of time-depth data below a topmost unit for deriving the data, the representations of degree of fit data are constructed by translating the data along the time axis.

3. The method of claim 1 wherein a quantity indicative of (a) said data or (b) output information is represented as a function of instantaneous velocity or slowness (i.e. the inverse of velocity) or interval or average velocity or slowness of sonic/seismic vibrations propagating in the ground.

4. The method of claim 3 wherein the quantity is the instantaneous velocity of sonic/seismic vibrations propagating in the ground at a particular depth.

5. The method of claim 3 wherein the quantity is the instantaneous slowness of sonic/seismic vibrations propagating in the ground at a particular depth.

6. The method of claim 1 wherein the representations are displayed.

7. The method of claim 6 wherein the displayed representations include contours of equal degree of fit measures.

8. The method of claim 6 further including the step of constructing a plurality of representations of degree of fit data in parameter space, each of the plural representations pertaining to one or more sets of well and/or seismic velocity data.

9. The method of claim 1 further including determining a value or a range of values for each parameter.

10. The method of claim 1 further including displaying within the parameter space contours or parameter values within the contours, and using the contours or parameter values for or in a parameter determination process.

11. The method of claim 10 further including using the contours or parameter values within the contours to obtain geological information about the ground wherein the sonic vibrations propagated in the ground.

12. The method of claim 1 wherein the mathematical function has two or three parameters.

13. The method of claim 12 wherein the mathematical function is the linear function $V_z = V_0 + kZ$ or a transformation thereof.

14. The method of claim 12 wherein the mathematical function is the Faust function ($V_z = A Z^{1/n}$) or a transformation thereof.

15. A method of approximately determining first and second parameters of a theoretical equation having two parameters and two variables describing how an acoustic wave travels as a function of depth through a unit of the earth, the acoustic wave travelling through the unit to a sonic/seismic transducer, comprising responding to sonic/seismic data derived by the transducer responding to the acoustic wave by establishing at least one two dimensional contour, each contour representing a value of acoustic wave travel discrepancy from the theoretical equation of the acoustic wave travel time to the transducer through the first unit, presenting the at least one contour on a two coordinate axis display having a first coordinate axis determined by differing values of the first parameter and a second coordinate axis determined by differing values of the second parameter, and determining the values of the parameters from a point on the display, the point being derived from a contour associated with a discrepancy having a very low value, the value of the first parameter being the coordinate value of the point along the first coordinate axis and the value of the second parameter being the coordinate value of the point along the second coordinate axis.

16. The method of claim 15 wherein the first and second coordinate axes are respectively n and A in the equation $V_z=AZ^{1/n}$, where Z=depth in the unit and $V_z$ is velocity of the wave at depth Z.

17. The method of claim 15 wherein the method is performed in response to the acoustic wave travelling through a first unit of the earth after having propagated through a second unit of the earth, the first and second coordinate axes being respectively $V_o$ and k in the equation $V_z=V_0+kZ$ where $V_z$ is velocity of the wave at depth Z, $V_o$ is velocity at the depth of the first unit closest to the second unit, and k=the reciprocal of travel time of the wave in the first unit.

18. The method of claim 15 wherein the unit includes segments having differing characteristics, each having a differing one of said contours, said differing contours having values overlapping on the display, and determining the values of the parameters in one of the segments from a point on the display where the differing contours overlap.

19. The method of claim 15 wherein the two variables describe a velocity vs. depth characteristic.

20. The method of claim 15 wherein the two variables describe a travel time vs. depth characteristic.

21. The method of claim 15 wherein the two variables describe a slowness vs. depth characteristic.

22. A method of approximately determining first and second parameters of a theoretical equation having two parameters and two variables describing how an acoustic wave travels as a function of depth through a unit of the earth, the acoustic wave travelling through the unit to a sonic/seismic transducer, comprising responding to sonic/seismic data derived by the transducer responding to the acoustic wave by establishing data representing at least one two dimensional contour, each contour representing a value of acoustic wave travel discrepancy from the theoretical equation of the acoustic wave travel time to the transducer through the first unit, deriving data commensurate with the at least one contour as if the contour were presented on a two coordinate axis display having a first coordinate axis determined by differing values of the first parameter and a second coordinate axis determined by differing values of the second parameter, and determining the values of the parameters from data values commensurate with a point on such a display, the point being derived from data corresponding with a contour associated with a discrepancy having a very low value, the value of the first parameter being commensurate with the coordinate value of the point on such a display along the first coordinate axis and the value of the second parameter being the coordinate value of the point on such a display along the second coordinate axis.

23. The method of claim 22 wherein the first and second coordinate axes on such a display are respectively n and A in the equation $V_z=AZ^{1/n}$, where Z=depth in the unit and $V_z$ is velocity of the wave at depth Z.

24. The method of claim 22 wherein the method is performed in response to the acoustic wave travelling through a first unit of the earth after having propagated through a second unit of the earth, the first and second coordinate axes on such a display being respectively $V_o$ and k in the equation $V_z=V_0+kZ$, where $V_z$ is velocity of the wave at depth Z, $V_o$ is velocity at the depth of the first unit closest to the second unit and k=the reciprocal of travel time of the wave in the first unit.

25. The method of claim 22 wherein the unit includes segments having differing characteristics, each having a differing one of said contours on such a display, said differing contours having values overlapping on such a display and determining the values of the parameters in one of the segments from a point where the differing contours on such a display overlap.

26. The method of claim 22 wherein the two variables describe a velocity vs. depth characteristic.

27. The method of claim 22 wherein the two variables describe a travel time vs. depth characteristic.

28. The method of claim 22 wherein the two variables describe a slowness vs. depth characteristic.

29. A method of obtaining a good fit between first and second plots of travel times vs. depth of first and second acoustic waves propagating in a unit of the earth, the acoustic waves travelling from the unit to a seismic transducer, the plots being on a two dimensional display having a travel time coordinate and a depth coordinate, comprising the step of translating the plots relative to each other along the travel time coordinate so the plots substantially coincide on the display.

30. The method of claim 29 wherein one of the plots has a known velocity vs. depth characteristic, and determining the velocity vs. depth characteristic of the other plot from the known velocity vs. depth characteristic of the one plot when the first and second plots substantially coincide on the display.

* * * * *